(12) United States Patent
Redko et al.

(10) Patent No.: US 7,968,673 B2
(45) Date of Patent: Jun. 28, 2011

(54) POLYAZACROWN-BASED MATERIALS FOR MERCURY CAPTURE AND SYNTHESIS OF THOSE MATERIALS

(75) Inventors: Mikhail Y. Redko, East Lansing, MI (US); James E. Jackson, Haslett, MI (US); Volodymyr Tarabara, East Lansing, MI (US); Julian Taurozzi, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 672 days.

(21) Appl. No.: 12/070,423

(22) Filed: Feb. 19, 2008

(65) Prior Publication Data

US 2009/0057233 A1    Mar. 5, 2009

Related U.S. Application Data

(60) Provisional application No. 60/902,285, filed on Feb. 20, 2007.

(51) Int. Cl.
*C08G 73/06* (2006.01)
(52) U.S. Cl. ........................................ 528/423; 528/422
(58) Field of Classification Search .................. 528/422, 528/423
See application file for complete search history.

(56) References Cited

U.S. PATENT DOCUMENTS 7,498,432 B2 * 3/2009 Redko et al. .................. 540/472
2004/0267009 A1 12/2004 Redko et al.

OTHER PUBLICATIONS

Trasande et al., Environmental Health Perspective, 2005, 113(5), p. 590-596.
Leonhaeuser et al., Engineering in Life Sciences, 2006, 6(2), p. 139-148.
Vidic, Environmental Separation of Heavy Metals, 2002, p. 15-44.
Ross, U.S. EPA Report EPA-670/2-73-080,1973.
Atwood et al., "Recent Developments in Mercury Science", in Structure and Bonding, 2006, 120 p. 163-182.
Liu et al., Advanced Materials, 1998, 10(2), p. 161-165.
Liu et al., Chemical Engineering & Technology, 1998, 21(1), p. 97-100.
Calmon, Ion Exch. Pollut. Control, 1979, 1, p. 201-206.
Michelsen et al., U.S. NTIS Report PB-244890, 1975.
Russell, U.S. NTIS Report DP-1395, 1975.
Tratnyek et al., U.S. NTIS Report t Report PB-211128,1972.
Buckley et al., Canadian Report AECL-10174, 1990.
Okamoto et al., U.S. NTIS Report PB-249848, 1975.
Wing et al., U.S. Agr. Res. Serv., West. Reg., Report ARS-W-19, 1974, p. 26-31.
Redko et al., Synthesis, 2006, 5, p. 759-761.
Martin et al., Inorganica Chimica Acta, 1994, 218(1-2), p. 5-8.
De Santis et al., Inorg. Chem., 1997, 36(10), p. 1998-2003.
Smith et al., Critical Stability Constants, Plenum Press, New York, 1975.
Jones, et al., J. Chem. Soc., Chem. Comm., 1979, 3, p. 140-141.
Farrell et al., Dalton Transactions, 2006, 26, p. 3204-3211.

* cited by examiner

*Primary Examiner* — Edward J Cain
(74) *Attorney, Agent, or Firm* — Ian C. McLeod

(57) ABSTRACT

Polyazacrown polymers based on the azacrown monomer 1,4,7,10,13,16,21,24-octaazabicyclo[8.8.8]hexacosane ("$H_6Aza222$") are disclosed. Azacrown monomer units are preferably linked with a suitable linking agent, and the resulting polymers are can absorb mercury from a water stream and form a stable complex therewith. Methods of making and using the polyazacrown polymers are also disclosed. The polymers have a high absorption capacity for and selectivity towards mercury, which properties are useful for the remediation of mercury-contaminated water. The polymers can be regenerated by the efficient removal of the absorbed mercury. Further, the absorbed mercury that is liberated from the polyazacrown polymers can be effectively concentrated and captured to prevent its re-release into the environment.

33 Claims, 6 Drawing Sheets

Complexant resin

L1 - NH₃, L2 - NH₂CH₂CH₂NH₂, L3 - NH₂(CH₂CH₂NH)₂H, L4 - NH₂(CH₂CH₂NH)₃H,

L5 - N(C₂H₄NH₂)₃, L6 - NH₂(CH₂CH₂NH)₄H,

L8 - NH₂(CH₂CH₂CH₂NH)₃H,

L9 - [(H₂NC₂H₄)₂NCH₂]₂,

L7 -

L10 -

L11 -

L12 -

L13 -

L14 -

L15 -

L16 -

L17 -

L18 - H₆Aza222

L19 -

L20 -

L21 -

L22 -

L23 -

L24 - R=Me
L25 - R=Et

POLYAZACROWN-BASED MATERIALS FOR MERCURY CAPTURE AND SYNTHESIS OF THOSE MATERIALS

CROSS-REFERENCE TO RELATED APPLICATION

Priority is claimed to provisional application No. 60/902,285, filed Feb. 20, 2007, the entire disclosure of which is herein incorporated by reference.

STATEMENT REGARDING FEDERALLY SPONSORED RESEARCH OR DEVELOPMENT

This research was funded by a grant from the National Science Foundation No. BES 0604368. The U.S. Government has certain rights in this invention.

BACKGROUND OF THE DISCLOSURE

1. Field of the Disclosure

The disclosure relates to polyazacrown-based materials as well as methods for their manufacture and use, for example regenerable polyazacrown polymers used to remove mercury from contaminated water.

2. Brief Description of Related Technology

Mercury released into the environment can poison people either in its released form (e.g., Hg, $Hg^{2+}$) or after biotransformation into even more poisonous derivatives, for example methylmercury ($MeHg^+$) and dimethylmercury ($Me_2Hg$). Mercury and its derivatives tend to concentrate in living organisms which often lack a mechanism of mercury removal (e.g., metabolism, excretion). Such accumulated mercury can then be introduced into the human food chain. In particular, mercury cations ($Hg^{2+}$) accumulate in aquatic life forms as methylmercury, for example being present in algae and zooplankton at levels of about 30 ng/g to about 50 ng/g, in forage fish at a level of about 500 ng/g, and in game fish (i.e., which can be consumed by humans) at a level of about 1300 ng/g. In humans, mercury mainly concentrates in kidneys and neural cells, thus decreasing the IQ of a poisoned individual and causing irreversible damage to children. For example, it is estimated that between 300,000 to 600,000 US children have a blood mercury content at levels of at least 5.8 µg/L (Trasande et al., *Environmental Health Perspective*, 2005, 113(5), p. 590-596).

Generating about 48 tons/year of mercury, coal-burning power plants account for over 40 percent of all human-based mercury emissions in the United States, which makes them the major artificial source of mercury in the environment. Given increasing energy costs, the search for alternative fuels (e.g., relative to crude oil), and the abundance of domestic coal reserves, coal liquefaction processes used to produce synthetic fuels may become attractive energy alternatives. In this case, however, the potential environmental contamination due to mercury emissions can be expected to increase.

Economic losses in the United States resulting from mercury poisoning are estimated to be about $8.7 B/year, with about $1.3 B/year being attributable to coal-originated mercury emissions. In response to these losses, the US EPA issued in 2005 the Mercury Air Mercury rule that aims to reduce mercury emissions from coal power plants to 38 tons/year by 2010 and to 15 tons/year by 2018.

A number of methods for capturing mercury and its derivatives have been developed. Such methods include microbial demercuryzation (Leonhaeuser et al., *Engineering in Life Sciences*, 2006, 6(2), p. 139-148), mercury absorption on powdered activated carbon (PAC) which may be sulfur-impregnated for higher efficiency (Vidic, *Environmental Separation of Heavy Metals*, 2002, p. 15-44), precipitation of mercury sulfide (Ross, U.S. EPA Report EPA-670/2-73-080, 1973) or thiolates (Atwood et al., "Recent Developments in Mercury Science," in *Structure and Bonding*, 2006, 120, p. 163-182) from aqueous solutions, absorption on thiol-modified mesoporous materials (Liu et al., *Advanced Materials*, 1998, 10(2), p. 161-165; Liu et al., *Chemical Engineering & Technology*, 1998, 21(1), p. 97-100), capture with non-selective synthetic polymers (e.g., ion-exchange resins (Calmon, *Ion Exch. Pollut. Control*, 1979, 1, p. 201-206), non-specific complexing materials (Michelsen et al., U.S. NTIS Report PB-244890, 1975), shredded tire rubber (Russell, U.S. NTIS Report DP-1395, 1975), or natural polymers (e.g., animal's wool (Tratnyek et al., U.S. NTIS Report t Report PB-211128, 1972)). Complex techniques utilizing more than one separation method or process have been considered as well (Buckley et al., Canadian Report AECL-10174, 1990; Nichols et al., U.S. NTIS Report OWRT-C-200009-R(2410)(1), OWRT-RU-84/6; Order No. PB84-228212, 1983; Okamoto et al., U.S. NTIS Report PB-249848, 1975; Wing et al., U.S. Agr. Res. Serv., West. Reg., Report ARS-W-19, 1974, p. 26-31).

However, the existing techniques do not allow for highly selective binding of mercury by air-stable, regenerable materials exhibiting a high capacity for mercury. For example, microbial demercurization leads to the reduction of mercury ions and formation of mercury atoms that either agglomerate into small mercury droplets or evaporate into the atmosphere. Thus, the mercury is not removed from the environment in a concentrated form. Ion-exchange resins are not selective, which leads to mercury displacement by other, more environmentally abundant metals (e.g., copper), that limits the capacity of such resins. The soft nature of mercury cations leads to their tendency to form complexes with polyamines and thiols, which may be used for mercury capture and removal. Similar to the process taking place in the ion-exchange resins, however, the typically much more environmentally abundant copper forms even more stable complexes with polyamines and catalyzes the oxidation of thiols into disulfides, thus reducing the binding ability of these compounds. Sorbents, like finely divided tire rubber, sulfur-doped activated carbon, and animal's wool can absorb mercury and decrease its concentration in water by a factor of about 100 to about 1000. However, the problem of sorbent regeneration has not been solved, and the only proposed way to deal with such materials after mercury absorption is combustion, which leads to the re-release of mercury into the environment.

Thus, there exists a need for more effective and versatile materials and processes for capturing mercury and removing it from the environment. Preferably, the new materials will (1) have a high capacity for mercury removal, (2) be highly selective for mercury (i.e., relative to other, less hazardous and potentially more abundant environmental contaminants), (3) be air-stable, and (4) be amenable to re-use via a suitable regeneration process.

SUMMARY

Disclosed herein are polyazacrown polymers that have a high capacity for and selectivity towards absorbed mercury (and/or its various environmental derivatives and certain other heavy metal cations). The polyazacrown polymers can be regenerated by the efficient removal of the absorbed mercury. Further, the absorbed mercury that is liberated from the polyazacrown polymers can be effectively concentrated and captured to prevent its re-release into the environment.

In one embodiment, a polyazacrown polymer includes linked azacrown moieties of the formula $C_{18}H_{36}N_8L_xR_{6-x}$, wherein: L is one or more linking units derived from one or more linking agents having two or more leaving groups; R is one or more of hydrogen (H), a functionalizing moiety, and combinations thereof; and, x ranges from 2 to 6. Preferably, the azacrown moieties are based upon the azacrown monomer $C_{18}H_{42}N_8$, and the R groups in the general polymer formula are hydrogen atoms (H). In an embodiment, the linking agents include hydrocarbon-based chains that are 2 or more atoms in length, and the leaving groups are selected from vinyl groups, epoxides, halogens, tosyl groups, tetrahydrothiophenes, sulfonic acids, nitriles, and combinations thereof. Preferred linking agents include 1,4-di-chloromethyl benzene, and/or 4,4'-bis(chloromethyl)-1,1'-biphenyl. Preferably, the polyazacrown polymer is a network polymer and x is more than 2 or x is about 3 or more. In an embodiment, the polyazacrown polymer has a microporous or a fractal structure, for example with a porosity ranging from about 0.5 to about 0.9. The polyazacrown polymer can further include cations retained by the azacrown moieties, for example $Cd^{2+}$, $Hg^{2+}$, $Pb^{2+}$, $Tl^{3+}$, and combinations thereof. Alternatively or additionally, the polyazacrown polymer can further include one or more mercury derivatives retained by the azacrown moieties, for example Hg, $Hg_2^{2+}$, $Hg^{2+}$, $MeHg^+$, $Me_2Hg$, $PhHg^+$, and combinations thereof.

In another embodiment, an azacrown derivative includes an azacrown moiety of the formula $C_{18}H_{36}N_8L_xR_{6-x}$, wherein: L is one or more linking units derived from one or more linking agents having two or more leaving groups; R is one or more of hydrogen (H), a functionalizing moiety, and combinations thereof; and, x ranges from 1 to 6. Preferably, the azacrown moiety is based upon the azacrown monomer $C_{18}H_{42}N_8$, and the R groups in the general formula are hydrogen atoms (H). Preferably, the linking agents include 1,4-bis(chloromethyl)benzene and/or 4,4'-bis(chloromethyl)-1,1'-biphenyl. Preferably, x is 2 or more, more preferably 3 or more. In an embodiment, a polyazacrown compound includes two or more of the azacrown moieties of the foregoing azacrown derivative, wherein adjacent azacrown moieties are linked by at least one linking unit.

In yet another embodiment, a polyazacrown polymer remediation cartridge includes a cartridge having an inlet, an outlet, and an interior volume; and a polyazacrown polymer (according to any of the foregoing general or preferred embodiments) occupying at least a portion of the interior volume of the cartridge such that a fluid flowing into the cartridge via the inlet is able to flow through the interior volume and contact the polyazacrown polymer before exiting the cartridge via the outlet. Preferably, the polyazacrown polymer is a network polymer and has an average functionality of more than 2. In an embodiment, the polyazacrown polymer is in the form of a packed bed of individual polymer particles. In another embodiment, the polyazacrown polymer has a microporous structure.

Also disclosed is a method of forming a polyazacrown polymer, which method includes: first providing an azacrown monomer of the formula $C_{18}H_{36}N_8R_6$, wherein (1) R is one or more of hydrogen (H), a functionalizing moiety, and combinations thereof and (2) at least 2 of the R groups are hydrogen; and then reacting the azacrown monomer with a sufficient amount of one or more linking agents having two or more leaving groups to form a polyazacrown polymer having linked azacrown moieties of the formula $C_{18}H_{36}N_8L_xR_{6-x}$, wherein x ranges from 2 to 6. Preferably, the azacrown monomer is $C_{18}H_{42}N_8$, and the R groups in the general monomer formula are hydrogen atoms (H). The method can include reacting the azacrown monomer with the linking agents in the presence of a base, for example a poorly nucleophilic base such as N,N-diisopropyl-N-ethyl amine, N,N-diisopropyl-N-ethanol amine, and/or N,N-dicyclohexyl-N-methyl amine. The method also can include reacting the azacrown monomer with the linking agents in the presence of a structure-directing agent (e.g., polyethylene oxide); and then removing the structure-directing agent after the polyazacrown polymer is formed, such that the resulting polyazacrown polymer has a microporous structure. Alternatively, the method also can include reacting the azacrown monomer with the linking agents in the presence of polyethylene oxide and a glass frit; and then removing the polyethylene oxide and the glass frit after the polyazacrown polymer is formed, such that the resulting polyazacrown polymer has a fractal structure. The method also can include reacting the azacrown monomer with the linking agents in the presence of a solvent, for example water, ethylene glycol, dimethylformamide, dimethylacetamide, benzyl cyanide, mineral oil, and/or decalin. Reaction temperatures preferably range from about 0° C. to about 220° C. or about 100° C. to about 220° C. Preferred linking agents include 1,4-bis(chloromethyl)benzene and/or 4,4'-bis(chloromethyl)-1,1'-biphenyl. The polyazacrown polymer is a preferably network polymer where x is more than 2.

Also disclosed is a method of remediating a mercury-contaminated fluid stream, which method includes: providing a contaminated fluid stream having one or more mercury derivatives; and then contacting a polyazacrown polymer (according to any of the foregoing general or preferred embodiments) with the contaminated fluid stream, thereby removing at least a portion of the mercury derivatives from the contaminated fluid stream to form a purified fluid stream and complexing the removed mercury derivatives with the polyazacrown polymer. The mercury derivatives preferably include Hg, $Hg_2^{2+}$, $Hg^{2+}$, $MeHg^+$, $Me_2Hg$, and/or $PhHg^+$, and more preferably include $Hg^{2+}$. Preferably, the purified fluid stream is substantially free from the mercury derivatives. The polyazacrown polymer is a preferably network polymer where x is more than 2. In an embodiment, the contaminated fluid stream is formed by first providing a solid medium (e.g., soil, sand, sediment, clay) having one or more mercury derivatives; and, contacting the solid medium with a fluid stream including a mercury-leaching salt (e.g., NaI), thereby removing at least a portion of the mercury derivatives from the solid medium to form the contaminated fluid stream.

Also disclosed is a method of regenerating a mercury-contaminated polyazacrown polymer, which method includes: providing a polyazacrown polymer (according to any of the foregoing general or preferred embodiments) complexed to one or more mercury derivatives; and, contacting the polyazacrown polymer with an acid and/or a water-soluble salt, thereby removing at least a portion of the complexed mercury derivatives from the polyazacrown polymer and forming a regenerated polyazacrown polymer. The mercury derivatives preferably include Hg, $Hg_2^{2+}$, $Hg^{2+}$, $MeHg^+$, $Me_2Hg$, and/or $PhHg^+$, and more preferably include $Hg^{2+}$. Preferably, the regenerated polyazacrown polymer is substantially free from the mercury derivatives. In an embodiment, the polyazacrown polymer is contacted with HCl and is then further contacted with a base to neutralize the acid (e.g., NaOH). In another embodiment, the polyazacrown polymer is contacted with $Na_2S$ and/or $(NH_4)_2S$. Once removed from the polyazacrown polymer, the mercury derivatives can be concentrated.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

Figure 1A:
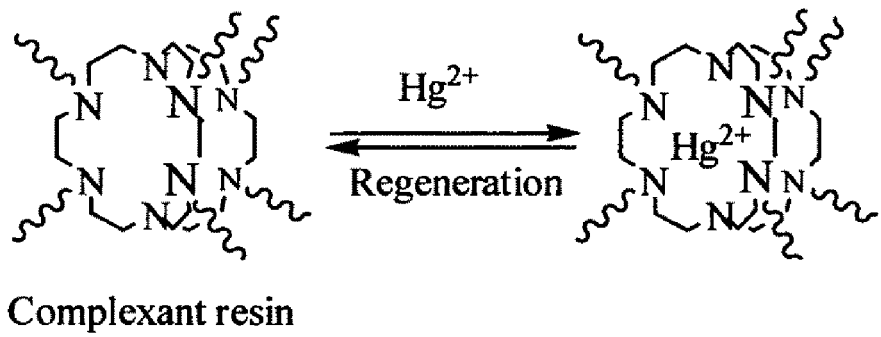
FIGS. 1a and 1b illustrate remediation and regeneration cycles using a networked polyazacrown polymer according to the disclosure to remove mercury from a contaminated water stream.

While the disclosed compositions and methods are susceptible of embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

DETAILED DESCRIPTION

Disclosed herein are polyazacrown materials and methods related to the same. The polyazacrown materials generally include a polyazacrown polymer, an azacrown derivative useful as an intermediate to form the polyazacrown polymer, and a polyazacrown polymer remediation cartridge. The methods generally include a method of forming the polyazacrown polymer, a method of remediating a contaminated fluid using the polyazacrown polymer, and a method of regenerating a contaminated polyazacrown polymer.

Polyazacrown Polymers

The disclosed polyazacrown polymers can be described in terms of linked azacrown moieties that are derived from an azacrown monomer. A typical azacrown monomer includes $C_{18}H_{42}N_8$ (or, equivalently, 1,4,7,10,13,16,21,24-octaazabicyclo[8.8.8]hexacosane; hereinafter "$H_6Aza222$"), which is illustrated in Formula I below.

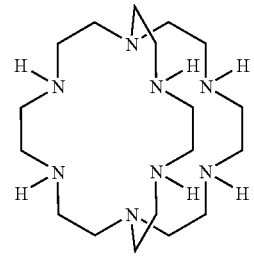

Formula I

As a starting material, the efficient formation of the $H_6Aza222$ azacrown monomer is known (Redko et al., *Synthesis*, 2006, 5, p. 759-761; see also U.S. Publication No. 2004/0267009, the content of which is herein incorporated by reference in its entirety).

The azacrown monomer can more generally include molecules in which some of the six amino-hydrogens have been substituted with functionalizing moieties, and the azacrown monomer is represented by the formula $C_{18}H_{36}N_8R_6$, where R is one or more of an amino-hydrogen (i.e., a hydrogen bonded to a nitrogen and not a carbon in the azacrown cage structure), a functionalizing moiety, and combinations thereof. The amino-hydrogens facilitate reactions with linking agents (described below) used to form the polyazacrown polymers. Accordingly, at least two of the R groups are preferably amino-hydrogens (i.e., since two links contribute to the growth of linear polymer segments), and more preferably at least three of the R groups are amino-hydrogens (i.e., since three links contribute to the growth of branched/networked polymer segments).

The identity of the functionalizing moiety is not particularly limited, inasmuch as the original amino-hydrogens of the azacrown monomers are relatively reactive and may be conveniently reacted with any of a variety of functionalizing agents. Further, the presence of the functionalizing moiety does not substantially negatively affect the ability of the resulting polyazacrown polymer to absorb contaminants, because it is the non-binding electron pairs of the azacrown cage nitrogens that stabilize a bound cation. Thus, the relevant features of the azacrown monomer for absorbing contaminants are (1) the presence of nitrogens in the cage structure and (2) the presence of at least two amino-hydrogens to facilitate a polymerization reaction with linking agents.

Adjacent azacrown moieties in the polyazacrown polymer are linked by intermediate linking units. Thus, the polyazacrown polymer can be represented by linked azacrown moieties of the formula $C_{18}H_{36}N_8L_xR_{6-x}$, where L is one or more linking units derived from one or more linking agents having two or more leaving groups. As before, R is one or more of an amino-hydrogen, a functionalizing moiety, and combinations thereof. However, because it is possible for all of the amino-hydrogens originally present in the azacrown monomer to be replaced by the linking units, there is no minimum number of amino-hydrogens in the polyazacrown polymer. The average functionality of the polyazacrown polymer is represented by "x" in the general polymer formula, and x ranges from 2 to 6. When the average functionality is 2, each azacrown moiety is linked to two other adjacent azacrown moieties, and the resulting polyazacrown polymer is effectively a linear polymer. When the average functionality is more than 2, the polyazacrown polymer exhibits at least some degree of branching, and a network polymer (i.e., an interconnected branched polymer) can form as the average functionality increases beyond 2 up to the structural maximum of 6. When the average functionality is less than 6, some of the azacrown moieties retain their original amino-hydrogens and/or functionalizing moieties. Preferably, the polyazacrown polymer is a network polymer that may, in some applications, exhibit the properties of a thermoset plastic (i.e., a crosslinked solid polymer that cannot be dissolved in a solvent/acid or heated sufficiently to permit continuous deformation prior to thermal decomposition). Thus, the average functionality is preferably more than 2, about 3 or more, or about 4 or more. However, the reactivity of the amino-hydrogens decreases as the level of substitution of the basic azacrown monomer $H_6Aza222$ increases (i.e., regardless of whether the substitution is due to linking units or functionalizing moieties), so the average functionality is generally less than 6, for example about 5 or less, and the azacrown moieties often retain at least one amino-hydrogen.

The linking units are derived from one or more linking agents having two or more leaving groups that are reactive with the amino-hydrogens of the azacrown monomer, thereby being capable of joining two azacrown moieties. Preferably, the linking agents include hydrocarbon-based chains that are at least 2 atoms in length, for example chains ranging from 3 to about 20 atoms in length, or about 5 to about 15 atoms in length. The hydrocarbon-based chains are not particularly limited, and can include aliphatic hydrocarbon segments (e.g., alkyl, alkenyl, alkynyl, alicyclic), aromatic hydrocarbon segments, ether groups, carbonyl groups, sulfonyl groups, nitrile groups, vinyl groups, epoxides, and combinations thereof. The leaving groups can include groups that leave the linking agent upon reaction with the amino-hydrogens (e.g., halogens, tosyl groups, tetrahydrothiophenes, sulfonic acids, and combinations thereof) and also can include groups that are modified upon reaction with the amino-hydrogens to form a bond between the linking unit and the azacrown moiety (e.g., vinyl groups, epoxides, and combinations thereof). Multiple leaving groups can be used, for example either in a single linking agent molecule (e.g., a single molecule includes two different leaving groups) or a blend of multiple different linking agents. Preferably, the linking agents are sufficiently long to allow adjacent azacrown moieties to assume a sterically stable conformation in the resulting polyazacrown polymer. In an embodiment, the linking agents are preferably relatively rigid (i.e., having relatively few or limited axes of rotation), thus reducing the likelihood of both ends of a linking agent molecule from bonding to nitrogens in the same azacrown moiety and, accordingly, increasing the likelihood that a single linking agent molecule links two adjacent azacrown moieties. Conversely, the linking agents are preferably sufficiently compact such that the resulting polyazacrown polymer has a substantial weight fraction of the contaminant-absorbing azacrown functionality.

Specific examples of suitable linking agents include 1,4-di-chloromethyl benzene (or α,α'-dichloro-p-xylene), 4,4'-bis(chloromethyl)-1,1'-biphenyl, polyethyleneglycol diacrylates (n=1-4), 1,2-di(vinylsulfonyl)-ethane, 1,2,3,4-diepoxy butane, 1,3,5-tri-chloromethyl benzene, 1,1'-[1,4-phenylenebis(methylene)]bis[tetrahydrothiophenium]salts (e.g., $X^-=Cl^-, ClO_4^-, HSO_4^-, PF_6^-$), ethylene glycol bis(hydrogen sulfate), as illustrated in Formulas II-IX below, respectively.

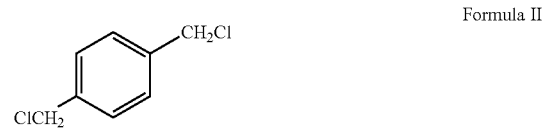

Formula II

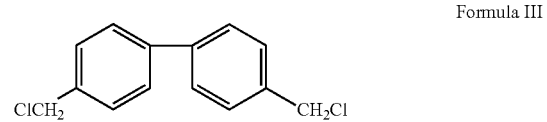

Formula III

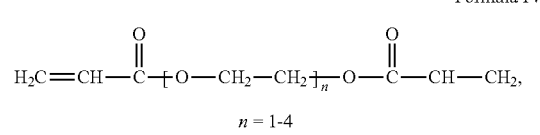

Formula IV

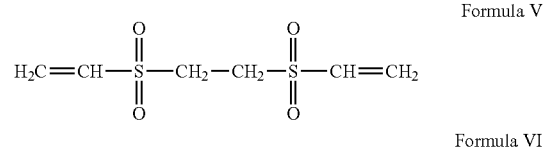

$n = 1-4$

Formula V

Formula VI

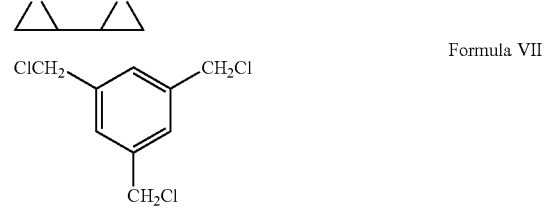

Formula VII

Formula VIII

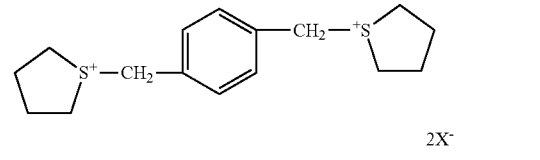

2X⁻

Formula IX

The foregoing linking agents form linked azacrown moieties by reacting with the nitrogens at the amino-hydrogen sites of the azacrown monomer via different mechanisms, for example acid elimination, N—H addition across an activated double C=C bond, opening of an epoxide ring, nucleophilic substitution resulting from the displacement of an anion, a neutral molecule, or a dianion. Preferred linking agents include 1,4-di-chloromethyl benzene and/or 4,4'-bis(chloromethyl)-1,1'-biphenyl, both of which are relatively rigid linking agents, because they can be used to form mechanically and chemically robust networked polyazacrown polymers. Other linking agents can be used to form less rigid polyazacrown polymers, for example for use in gels, suspensions, and/or membranes. Suitable linking agents for such polymer forms include divinyl sulfone and low-molecular weight polyethylene glycol derivatives represented by X—$(CH_2CH_2O)_n$—$CH_2CH_2X$, where n ranges from 1 to 3 and X can be Cl, I, and/or OTs.

Accordingly, suitable linking units are the same as the suitable linking agents, less one or more of the leaving groups. For example, the linking agent 1,4-di-chloromethyl benzene yields para —$CH_2$—$C_6H_4$—$CH_2$— linking units when it links two adjacent azacrown moieties in the polyazacrown polymer. However, due to incomplete alkylation, some of the linking agent may be present in the polyazacrown polymer as para —$CH_2$—$C_6H_4$—$CH_2Cl$ when it is bound to only one azacrown moiety.

The polyazacrown polymer can be formed by reacting the azacrown monomer of the formula $C_{18}H_{36}N_8R_6$ with a sufficient amount of one or more the linking agents to form the polyazacrown polymer having linked azacrown moieties of the formula $C_{18}H_{36}N_8L_xR_{6-x}$ having the desired average functionality (e.g., x ranging from 2 to 6, preferably more than 2 and in the form of a network polymer). For example, a molar ratio of total linking agent to azacrown monomer of 2 to 6 (or 2 to 4) is generally sufficient to form the polyazacrown polymer, and a molar ratio of about 3 (or more) is generally sufficient to form the networked polyazacrown polymer.

Thus, a useful intermediate composition for the formation of the polyazacrown polymer includes an azacrown derivative which is the reaction product of an azacrown monomer unit and 1 to 6 linking agents (i.e., $C_{18}H_{36}N_8L_xR_{6-x}$, where x ranges from 1 to 6). Thus, the azacrown derivative is a single azacrown moiety in which 1 to 6 of the amino-hydrogens have been eliminated in a reaction with the linking agents. For example, when the azacrown derivative includes 1 linking agent, the resulting derivative can be used to propagate/build linear portions of the polyazacrown polymer (i.e., in which a linking agent "tail" of the azacrown derivative can react with an amino-hydrogen of an azacrown "head" of an adjacent azacrown derivative). Similarly, azacrown derivatives with 2 or more (3 or more) linking agents can be used to not only propagate the polyazacrown polymer, but also to form branching side chains and/or networking crosslinks. The azacrown derivative can also form the basis for a polyazacrown compound having two or more azacrown moieties linked by at least one linking unit. For example the polyazacrown compound can include a dimer (i.e., two linked azacrown moieties), where the dimer could then be used, for instance, to build a polyazacrown polymer or functionalize some other substance (e.g., polymeric or otherwise).

The reaction conditions between the azacrown monomer and the linking agent are not particularly limited, for example being performed over wide range of suitable temperatures, either with or without a solvent medium, and optionally in the presence of a neutralizing base. For example, reaction temperatures generally in the range of about 0° C. to about 220° C. are suitable, with temperatures ranging from about 100° C. to about 220° C. or about 120° C. to about 200° C. being preferred. Suitable solvents include water, ethylene glycol, dimethylformamide (DMF), dimethylacetamide (DMA), benzyl cyanide, mineral oil, and/or decalin (i.e., decahydronaphthalene, including its cis- and trans-forms). The neutralizing base is preferably included when the reaction between the azacrown monomer and the linking agent is expected to release acid (e.g., the leaving group is a halogen, as in the reaction of an amino-hydrogen and 1,4-di-chloromethyl-benzene which releases hydrochloric acid). Suitable neutralizing bases generally include poorly nucleophilic bases or Lewis bases such as alkyl amines and alkanol amines, for example N,N-diisopropyl-N-ethyl amine, N,N-diisopropyl-N-ethanol amine (2-(diisopropylamino)-ethanol), and/or N,N-dicyclohexyl-N-methyl amine.

Figure 6A:
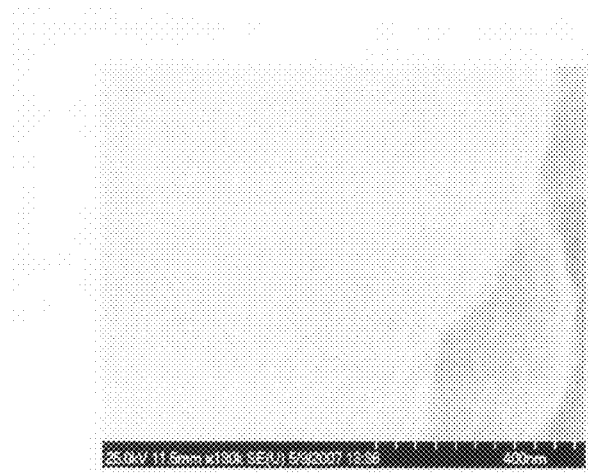
FIGS. 6a to 6e are scanning electron micrographs (SEM images) of a microporous, networked polyazacrown polymer according to the disclosure, the microporous structure being illustrated at several different length scales.
Figure 6D:
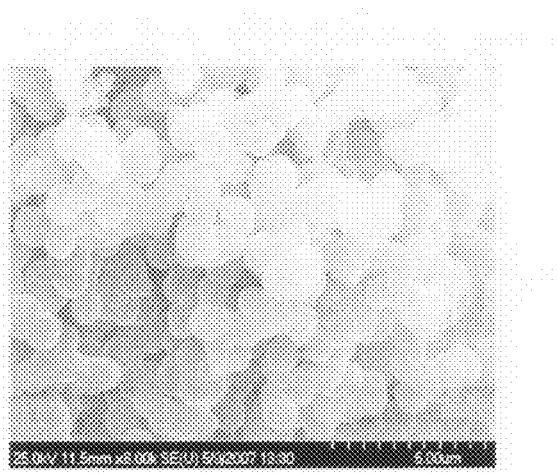
Figure 6B:
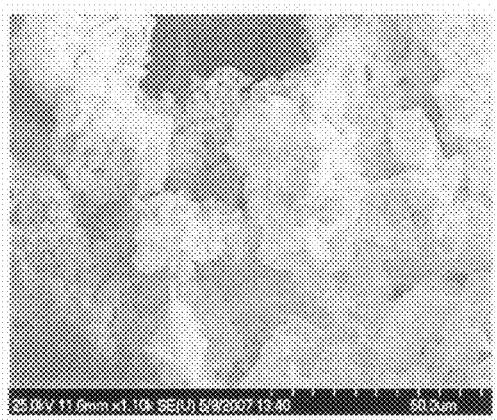
Figure 6E:
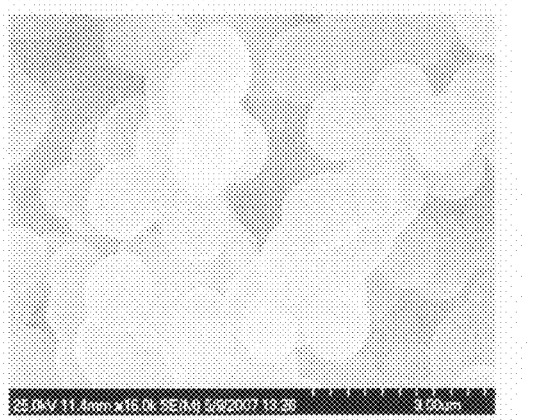
Figure 6C:
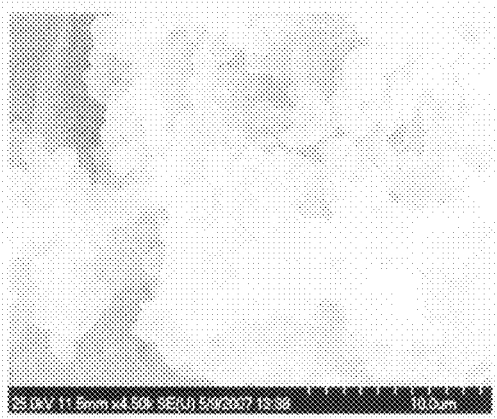

The reaction between the azacrown monomer and the linking agent can be performed in the presence of a structure-directing agent. The structure-directing agent occupies interstitial areas created during the formation of the polyazacrown polymer. Once polymerization is complete, the structure-directing agent can be removed from the reaction product, for example by leaching with an appropriate solvent. Once the structure-directing agent is removed, the previously occupied interstitial areas are vacated to reveal a polyazacrown polymer having a microporous structure. The microporous structure, as illustrated in FIGS. 6a-6e (and discussed in more detail below), is desirable because it substantially increases the specific surface area (i.e., surface area per unit volume) of the resulting polyazacrown polymer, thus improving the mass-transfer characteristics of a contaminant cation both to and from the polyazacrown polymer. More specifically, the microporous structure is preferably a sponge-like mass of interconnected, substantially spherical polymer portions having about 60% of their surface area exposed and having characteristic sizes (e.g., diameters) less than about 1 μm, for example about 0.1 μm to about 1 μm (e.g., as illustrated in FIG. 6e). Preferably, the polyazacrown polymer has a sufficient porosity both to permit fluid to flow through the polyazacrown polymer interstices without an excessive pressure driving force and to provide structural integrity to the polyazacrown polymer. For example, the porosity preferably ranges from about 0.5 to about 0.9. The structure-directing agent can be included in the reaction system at a wide variety of concentrations, for example about 10 wt. % to about 80 wt. %, or about 50 wt. %, relative to the total amount of azacrown monomer, linking agent, and structure-directing agent.

The structure-directing agent is not particularly limited, although polyethylene oxide is an example of a suitable structure-directing agent that can be simply removed by washing the final polymer with water. The molecular weight of the polyethylene oxide is not particularly limited, for example including molecular weights ranging from about 200 to about 8000, about 400 to about 4000, or about 600. The microstructure of the polyazacrown polymer is affected by a phase separation process that occurs as the reaction between linking agents and azacrown moieties proceeds. It is believed that the phase separation process is affected by the molecular weight of the structure-directing agent. For example, an increasing molecular weight induces phase separation at an earlier stage of polymerization and results in a microstructure with smaller particles, and vice-versa for a decreasing molecular weight. Thus, the particular molecular weight of polyethylene oxide can be selected to control the characteristic dimensions of a resulting microporous structure.

The reaction between the azacrown monomer and the linking agent also can be performed in the presence of a glass frit in addition to the structure-directing agent to form a polyazacrown polymer having a fractal structure. Once polymerization is complete, the structure-directing agent can be first removed from the reaction product as described above, and then the glass frit can be subsequently removed by dissolution in hydrofluoric acid. The structure-directing agent still acts to form small (e.g., about 1 μm) semi-spherical microporous structures, while the removal of the glass frit generates larger pores (e.g., about 4 μm to about 20 μm in size) and the final fractal structure. Such materials can have the advantage of low flow resistance (i.e., due to the presence of larger pores) while retaining the advantage of rapid mass transfer (i.e., due to the high specific surface area of the microporous structures).

When a structure-directing agent is not used, the resulting polyazacrown polymer can be formed in a large, cohesive bulk polymer mass that is preferably resized into a plurality of smaller polymer particles. The polymer particles can be resized using any of a variety of conventional processes, for example pelletization, grinding, etc. The resulting polymer particles can then be used to form a packed bed of the polyazacrown polymer suitable for a mercury absorption process.

Remediation of Contaminated Fluids

The disclosed polyazacrown polymer can be used to remediate contaminated fluids (e.g., water) in a variety of processes. While the remediation of mercury-contaminated water is of particular interest, the polyazacrown polymer has selectivity towards the absorption of other contaminants as well.

For example, contaminated water can generally include a variety of hazardous metals that can be absorbed by the polyazacrown polymer. Certain cations can preferably complex to the azacrown moieties, for example including heavy metal cations such as $Cd^{2+}$, $Hg^{2+}$, $Pb^{2+}$, and/or $Tl^{3+}$. Alternatively or additionally, the contaminated water can include a broader class of mercury derivatives that can be complexed to and/or retained by the azacrown moieties, for example Hg, $Hg_2^{2+}$, $Hg^{2+}$, $MeHg^+$, $Me_2Hg$, and/or $PhHg^+$ (phenylmercury). The mercury (II)-complex is particularly environmentally relevant.

The contaminated water is then contacted with the polyazacrown polymer. At least a portion of the water contaminants (e.g., heavy metal cations and/or mercury derivatives) are then absorbed by and complexed with the polyazacrown polymer, thereby forming a purified water stream. This removal step is illustrated in FIG. 1a, in which the polyazacrown polymer ("complexant resin") absorbs $Hg^{2+}$ from a contaminated water stream to form a stable $Hg^{2+}$-azacrown moiety complex. In the illustrated embodiment of FIG. 1a, all six amino-hydrogens of the azacrown monomer have been substituted with linking units; however, as described in Example 2, below, some of the amino-hydrogens may still be present in the polyazacrown polymer. If desired to obtain a higher degree of contaminant removal, multiple purification steps can be performed in series, such that a partially purified water stream is re-contacted with a second polyazacrown polymer to remove additional water contaminants and form the purified water stream. Preferably, the purified water stream is free or substantially free from contaminants (e.g., preferably at or below concentrations that would adversely affect the environment and/or wildlife if the purified water stream were released into the environment, more preferably at or below concentrations that would be acceptable for human drinking water). For example, the purified water stream preferably contains about 1 μg/l or less, more preferably about 0.2 μg/l or less, for example about 0.05 μg/l or less or about 0.001 μg/l or less.

The polyazacrown polymer and its azacrown moieties are effective at binding cations because of the formation of nitrogen-cation donor-acceptor bonds using the non-bonded electron pair of the nitrogen atoms in the azacrown moiety cages. The large number nitrogen atoms in a single azacrown moiety (i.e., eight) helps stabilize the positive charge on a bound cation. Further, two of the eight nitrogen atoms naturally have their non-bonded electron pairs directed toward the interior of the azacrown cage structure, while the non-bonded electron pairs of the remaining six nitrogen atoms can rotate inwardly toward the cage interior upon complexation. In particular, the azacrown moieties are suitable for binding $Hg^{2+}$ because of the strength of the nitrogen-$Hg^{2+}$ donor-acceptor bond and the size compatibility of the azacrown interior cage structure and the $Hg^{2+}$ ion.

With respect to the various mercury derivatives, the azacrown moieties bind most stably with mercury ions (i.e., $Hg^{2+}$), but also can be used to bind mercury in other forms. For example, it is believed that an azacrown moiety can induce the heterolytic cleavage of an Hg—C bond in an organic mercury derivative (e.g., $MeHg^+$, $Me_2Hg$, $PhHg^+$), thus binding the mercury as $Hg^{2+}$ and releasing the organic portion of the original organometallic contaminant. For example, coordination by the eight nitrogen atoms in an azacrown moiety (or ligand L, as represented below) could increase the electron density on mercury derivative ($HgR^+$, as represented below), polarize the Hg—C bond in the mercury derivative, and cause the heterolytic cleavage of the same:

$$HgR^+ + L \rightarrow RHg^+L \quad (1)$$

$$RHg^+L + H^+ \rightarrow RH + Hg^{2+}L \quad (2)$$

According to the above mechanism, the cleavage and binding of $Hg^{2+}$ (and the corresponding release of RH, for example $CH_4$ or $C_6H_6$ from $MeHg^+$ or $PhHg^+$, respectively) occurs as a result of the complexing process with the azacrown moiety and does not necessarily require the use of an additional oxidizing agent to form $Hg^{2+}$ (e.g., in a pre-treatment step).

Similarly, it is believed that an azacrown moiety also can induce the cleavage of $Hg_2^{2+}$ into $Hg^{2+}$ and Hg, thereupon binding the generated $Hg^{2+}$ directly and then potentially capturing the Hg atom as described below for elemental mercury.

Additionally, the removal of elemental mercury (i.e., Hg, for example from a gaseous stream) is also a potential application of the polyazacrown polymer (i.e., in which case a contaminated fluid to be remediated can be a gas). This is an important application, because elemental mercury is one of the most prominent toxic contaminants in the exhausts of coal power stations. The azacrown moieties of the polyazacrown polymer may be able to directly bind Hg from a gaseous stream, for example under reducing conditions (i.e., when only Hg atoms may bind to the polymer) or in the presence of molecular oxygen that can serve as an oxidizing agent as illustrated in the following reaction (where the ligand L represents an azacrown moiety):

$$2L + 2Hg + O_2 + 2H_2O \rightarrow 2Hg^{2+}L + 4OH^-. \quad (3)$$

The disclosed polyazacrown polymer is also useful because the contaminated polymer (i.e., complexed to one or more of the above contaminants) can be simply regenerated, thereby providing fresh polymer for further remediation and limiting the introduction of a new waste stream into the environment (e.g., a mercury-contaminated polyazacrown polymer). The contaminated polymer can be regenerated by contacting the same with an acid (e.g., hydrochloric acid) or a water-soluble salt (e.g., a sulfide salt like $Na_2S$ or $(NH_4)_2S$). This regeneration step preferably results in polyazacrown polymer that is substantially free from complexed contaminants, thereby extending the useful life of the polymer in a waste remediation capacity. More specifically, the regenerated polyazacrown polymer preferably contains about less than about 10 wt. %, more preferably less than about 5 wt. % or less than about 2 wt. %, of the complexed contaminants (in particular $Hg^{2+}$).

Figure 1B:
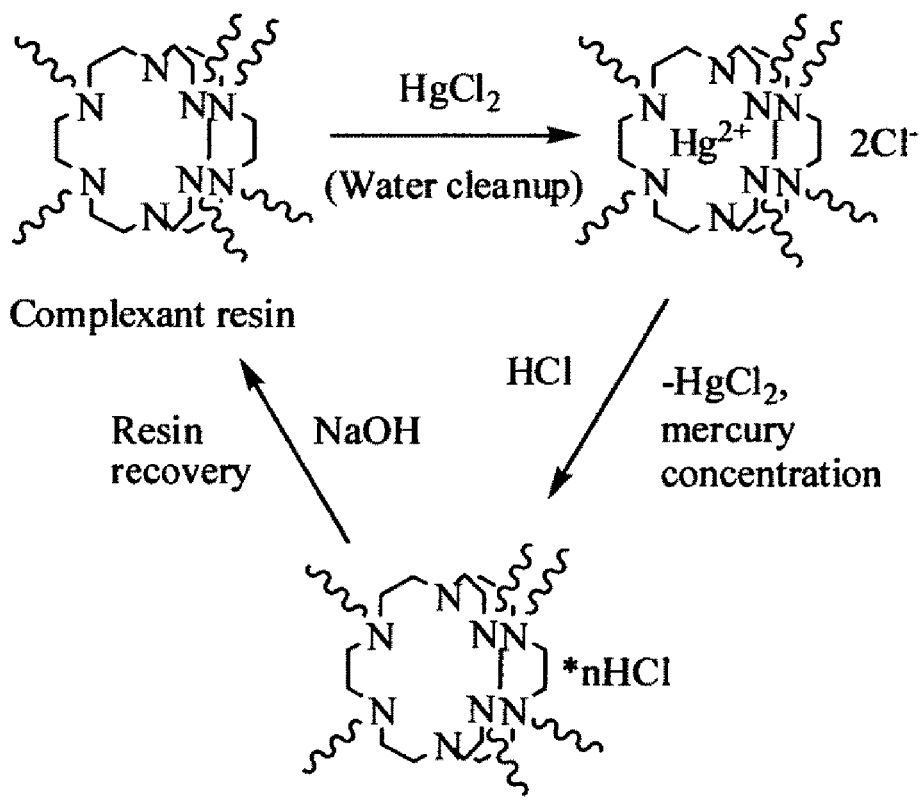

When regenerated with acid, the acid liberates and removes the complexed contaminant from the contaminated polyazacrown polymer (e.g., in the form of $HgCl_2$, as illustrated in FIG. 1b) by protonating the azacrown nitrogen atoms and expelling the positively charged metal ion, thereby forming a regenerated polyazacrown polymer. In this case, the regenerated polyazacrown polymer preferably is further contacted with a base (e.g., sodium hydroxide) to neutralize the acid, thereby allowing the regenerated polyazacrown polymer to further complex with new contaminants from a new contaminated water stream (e.g., as illustrated in the final step of FIG. 1b).

Similarly, a solution containing the water-soluble salt can induce the formation of a highly stable, water-soluble salt (e.g., a sulfide salt) that extracts the complexed metal ion contaminant from the azacrown moiety cage. For example, aqueous sodium sulfide can be used rinse a mercury-containing polyazacrown polymer to form the highly stable, water-soluble sodium mercury sulfide salt that can be subsequently acidified (e.g., after the aqueous salt solution elutes from a resin-filled column) to precipitate mercury in a concentrated form suitable for further waste handling (i.e., as mercury sulfide):

$$2Na_2S + Hg^{2+}L \rightarrow Na_2HgS_2 + 2Na^+ + L \quad (4)$$

$$Na_2HgS_2 + 2HCl \rightarrow 2NaCl + H_2S + HgS. \quad (5)$$

Similarly, aqueous ammonium sulfide can be used rinse a mercury-containing polyazacrown polymer to form the highly stable, water-soluble ammonium mercury sulfide salt. The subsequent heating of the ammonium mercury sulfide generates a mercury sulfide precipitate and a gaseous ammonia/hydrogen sulfide mixture which, once condensed, re-forms the water-soluble salt used to regenerate the polyazacrown polymer:

$$2(NH_4)_2S + Hg^{2+}L \rightarrow (NH_4)_2HgS_2 + 2NH_4^+ + L \quad (6)$$

$$(NH_4)_2HgS_2 + [heat] \rightarrow 2NH_3 + H_2S + HgS \quad (7)$$

$$2NH_3 + H_2S \rightarrow 2(NH_4)_2S. \quad (8)$$

Thus, a benefit of using ammonium sulfide is that it regenerates not only the polyazacrown polymer but also possibly recycles the water-soluble salt used therefor. In either case, the removal of the complexed contaminant in a concentrated form permits more efficient waste handling of the removed contaminant.

The disclosed remediation and regeneration methods can be conveniently performed in any suitably sized vessel containing the polyazacrown polymer. The polyazacrown polymer can be in any form, for example a microporous form, a ground particular form, or a combination thereof (i.e., a microporous polymeric solid that is ground into smaller microporous particulates). During a remediation process, the contaminated water flows into the vessel, contacts the polyazacrown polymer (during which time the contaminants are absorbed by and become complexed with the polyazacrown polymer), and then flows out of the vessel as a purified water effluent. During the regeneration process, the inflow of the contaminated water is halted, and the rinsing solution, such as that of acid or sulfide is fed to the vessel to remove the complexed contaminants from the polyazacrown polymer.

On a smaller scale, the remediation and regeneration methods can be conveniently performed in a single, self-contained unit, for example a polyazacrown polymer remediation cartridge. The unit includes cartridge having an inlet, an outlet, and an interior volume, for example a tubular cartridge having inlet and outlet orifices at opposing ends of the cartridge axis. The polyazacrown polymer occupies at least a portion of the interior volume of the cartridge such that a fluid flowing into the cartridge via the inlet (e.g., either the contaminated water during remediation, or the acid during regeneration) is able to flow through the interior volume and contact the polyazacrown polymer before exiting the cartridge via the outlet. The particular form of the polyazacrown polymer is not particularly limited, so long as it allows fluid through-flow with a sufficient surface area for mass transfer. For example, the polyazacrown polymer can be in the form of a packed bed of individual polymer particles and/or the polyazacrown polymer can have a microporous structure.

The foregoing remediation and regeneration methods also can be used as part of method to treat a solid medium contaminated with one or more contaminants (e.g., mercury derivatives). The solid medium is not particularly limited, but particular examples of environmental media likely to be contaminated with mercury include soil, sand, sediment, and/or clay. In such solid materials, mercury can be adsorbed on a mineral surface by attachment to silanol groups. The solid medium is then contacted with a water stream including a mercury-leaching salt to remove at least a portion of the mercury derivatives from the solid medium and to form a contaminated water stream including one or more mercury derivatives. A suitable mercury-leaching salt includes NaI, which is expected to favor the extraction of mercury from the polyazacrown polymer due to the high stability constants of the $HgI_4^{2-}$ and the $HgI_3^-$ ions (i.e., pK=29.8±0.1 and 27.6±0.1, respectively). The contaminated water stream is then contacted with the polyazacrown polymer as described above to purify the water stream.

The disclosed polyazacrown polymers have several advantages of conventional materials and processes using the same to remove mercury from the environment. Amines are much more resistant to oxidation than thiols, so the polyazacrown polymers provide a stable remediation medium that does not rapidly degrade during use. The cage-like geometry of the $H_6Aza222$ azacrown monomer is optimal for stably binding mercury (Martin et al., *Inorganica Chimica Acta*, 1994, 218 (1-2), p. 5-8), but not copper (De Santis et al., *Inorg. Chem.*, 1997, 36 (10), p. 1998-2003). Accordingly, the resulting polyazacrown polymers are mercury-selective. The polyazacrown polymers are further expected to form stable complexes with the mercury, with stability constants as high as about $10^{28.5}$, which is the value found for the free $H_6Aza222$ ligand. Additionally, the polyazacrown polymers are regenerable, which (1) extends their useful life during use, (2) reduces the potential addition of a new waste stream into the environment, and (3) liberates absorbed mercury during regeneration in a highly concentrated form, thus facilitating further waste processing.

EXAMPLES

The following Examples illustrate the disclosed compositions and methods, but are not intended to limit the scope of any claims thereto.

The reagents used in the following examples include: dicyclohexylmethylamine ($Cy_2NMe$) and 1,4-di-chloromethyl benzene (available from TCI America, Portland, Oreg.); N,N-diisopropyl-N-ethanol amine, N,N-diisopropyl-N-ethyl amine, dimethylformamide, dimethylacetamide, and Celite-545 silica (available from Sigma-Aldrich, St. Louis, Mo.); polyethylene glycol (molecular weight 600), mercury potassium iodide ($K_2HgI_4$), and mercuric perchlorate ($Hg(ClO_4)_2$) (available from Alfa Aesar, Ward Hill, Mass.); mercuric chloride ($HgCl_2$) (available from Baker Analyzed, Phillipsburg, N.J.); sodium sulfide ($Na_2S.9H_2O$, >98%) (available from Columbus Chemical Industries, Columbus, Wis.); and perchloric acid ($HClO_4$) (available from Honeywell Riedel-de-Haën, Hanover, Germany). All purchased reagents were used as received.

$H_6Aza222$ as a starting material was synthesized according to known procedures (Redko et al., *Synthesis*, 2006, 5, p. 759-761; see also U.S. Publication No. 2004/0267009).

Mercury concentrations were determined by atomic absorption (AA) measurements using a Varian SPECTRAA-200 spectrophotometer. The mercury detection limit of the AA analysis was about 3 ppm (i.e., mg $Hg^{2+}$ per L of aqueous solution analyzed, or, equivalently 300 µg in a 100 mL sample volume). Accordingly, the mercury detection limit of a 5-mL sample aliquot diluted to a 100-mL analysis volume was about 60 ppm (see, e.g., Example 4 below). Elemental carbon, hydrogen, and nitrogen (CHN) analysis was performed on a Perkin Elmer Series II CHNS/O ANALYZER 2400. Infrared (IR) spectra were collected on a Mattson GALAXY FTIR 3000 spectrometer.

Example 1

Determination of $Hg^{2+}$ $H_6Aza222$ Stability Constant $2Hg(ClO_4)_2.H_6Aza222$ was synthesized according to the following procedure. $Hg(ClO_4)_2.3H_2O$ (3.35 g, 7.39 mmol) was dissolved in a flask containing 60 mL of absolute ethanol and 0.3 mL acetic acid added to suppress the hydrolysis of $Hg(ClO_4)_2$. A solution of $H_6Aza222.1.37 H_2O$ (1.24 g, 3.14 mmol) in 5 mL of absolute ethanol was added to the same flask. The obtained suspension was stirred for 2 hr, filtered, rinsed with absolute ethanol, and dried on a filter to give $2Hg(ClO_4)_2.H_6Aza222$. The yield of the procedure was 2.64 g (72% based on $H_6Aza222$). CHN analysis of the product indicated an elemental composition of C 18.33%, H 3.56%, and N 9.41% (cf. C 18.49%, H 3.62%, and N 9.58% calculated values). The product was not recrystallized, because it tended to slowly decompose in refluxing ethanol.

The following procedure was used to determine the stability constant for $Hg^{2+}$ $H_6Aza222$, inasmuch as classical potentiometric titration has been shown to be inadequate for the determination of the stability constant (Martin et al., *Inorganica Chimica Acta*, 1994, 218(1-2), p 5-8). A stock solution was prepared by placing 2.43 g of the synthesized 2Hg(ClO$_4$)$_2$·H$_6$Aza222 into a mixture of 100 mL H$_2$O and 4.00 mL 1.000 M HClO$_4$, which served to suppress the hydrolysis of Hg$^{2+}$ cations. 8 mL aliquots of the stock solution were placed into each of six 20 mL vials, and the net solution volume in each vial was brought to 10 mL by dilution with 0, 0.4, . . . , 2 mL of 1.000M HClO$_4$ and, correspondingly, 2, 1.6, . . . , 0 mL of 0.1 M NaClO$_4$ solution, which served as a supporting electrolyte. The vials were allowed to stand for 16 hr, and then the pcH values of the solutions were measured by a pH meter calibrated for pcH measurements of solutions with an ionic strength of 0.1 M at 20±0.2° C. The stability constant $K_{HgL}$ $$K_{HgL} = \frac{[HgL^{2+}]}{[Hg^{2+}][L]} \quad (9)$$

was calculated according to the formula $$K_{HgL} = \frac{([Hg^{2+}] + [HgL^{2+}]) * \frac{\sum_{n=1}^{6} nK_n[H^+]^n}{[HClO_4]_{add} - [H^+]} - 1 - \sum_{n=1}^{6} K_n[H^+]^n}{([Hg^{2+}] + [HgL^{2+}]) + 2\frac{[HClO_4]_{add} - [H^+]}{\sum_{n=1}^{6} nK_n[H^+]^n} + \left(1 + \sum_{n=1}^{6} K_n[H^+]^n\right)} \quad (10)$$

where L is non-protonated H$_6$Aza222, and $K_n$ for the full protonation constants $$K_n = \frac{[H_n L^{n+}]}{[H^+]^n [L]} \quad (11)$$

were taken from the literature (De Santis et al., *A. Inorg. Chem.*, 1997, 36 (10), p. 1998-2003).

The equation for $K_{HgL}$ assumed the existence of H$_6$Aza222 (denoted as the ligand L) in free and protonated forms H$_n$L$^{n+}$ (n=1-6) and in the form of a ligand-mercury complex Hg$^{2+}$L. The possible existence of complexed protonated and/or hydrolyzed species (such as HHgL$^{3+}$ and HgOHL$^+$) and influence of deviations of the ionic strength from 0.1 on the stability constant were not considered. Based on five measurements, a logarithm of the stability constant was found to be Log $K_{HgL}$=28.5±0.1.

To estimate the applicability of H$_6$Aza222-based polyazacrown polymers for mercury removal in real systems and to compare their performance with that of the other immobilized ligands, the competition phenomena (i.e., between mercury and non-mercury ions) that may negatively impact the formation of ligand-mercury complexes should be considered. To name a few, protonation and complexation of other metals will decrease the amount of ligand available for mercury binding, while hydrolysis and complexation reactions with other ligands will decrease the concentration of mercury cations. Even though a thorough numerical modeling of the real systems may be unrealistic because of the large number of chemical species and processes involved, the comparative binding efficiency of different ligands in systems where mercury binding is challenged by ligand protonation, copper complexation, and metal hydrolysis can be considered. For this purposed, a model comparing mercury selectivity of ligands L1-L25 illustrated in FIG. 2 (where L18 is H$_6$Aza222) was used to estimate binding efficiencies by considering systems containing the following species in solution: H$^+$, OH$^-$, L, LH$_n$$^{n+}$, M$^{2+}$, MOH$^+$, and M(OH)$_2$, where M is Cu and Hg and L is any one of the ligands L1-L25.

Figure 2:
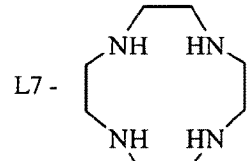
FIG. 2 illustrates a series of complexing ligands whose ability to selectively bind mercury is compared with that of $H_6Aza222$.
Figure 2:
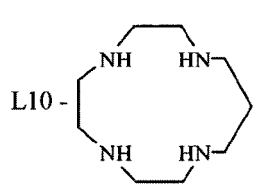
Figure 2:
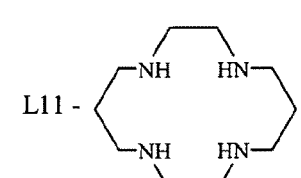
Figure 2:
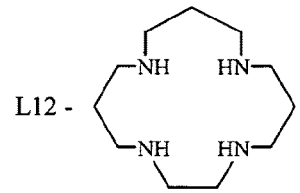
Figure 2:
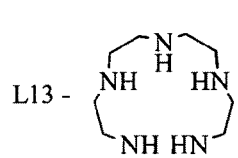
Figure 2:
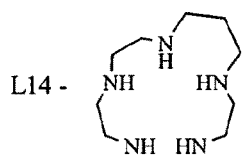
Figure 2:
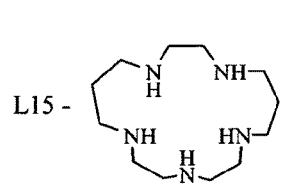
Figure 2:
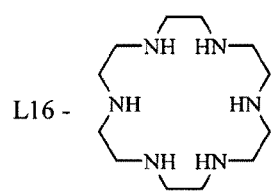
Figure 2:
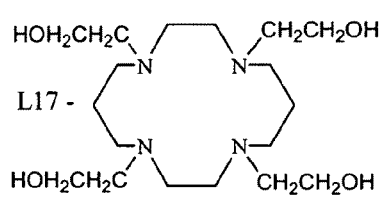
Figure 2:
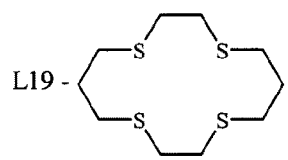
Figure 2:
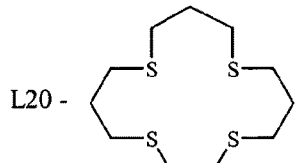
Figure 2:
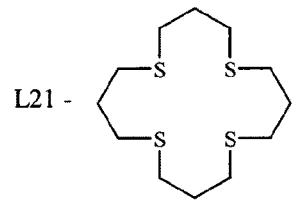
Figure 2:
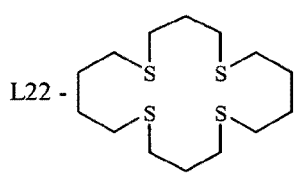
Figure 2:
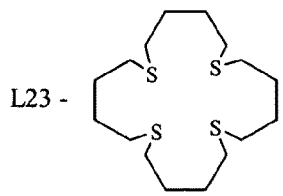
Figure 2:
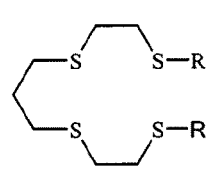

To compare the performance of H$_6$Aza222 with other polyamines in systems where metal ions (i.e., Hg$^{2+}$ and Cu$^{2+}$) would be prone to hydrolysis and the amines would be protonated, the effective stability constant $K_{ML}^{eff}$ and the effective selectivity constant $K_{Hg/Cu}^{eff,sel}$ were calculated for the pH ranges 0-14 for the amine ligands L1-L18 shown in FIG. 2 according to the following equations:

$$K_{ML}^{eff} = \frac{[ML^{2+}]}{[L]_{tot}[M]_{tot}} \quad (12)$$

$$= \frac{K_{ML}}{\left(1 + \sum_{n=1}^{6} K_n[H^+]^n\right)\left(1 + \frac{K_W}{[H^+]} * K_{MOH} + \frac{K_W^2}{[H^+]^2} * K_{M(OH)_2}\right)}$$

$$K_{Hg/Cu}^{eff,sel} = \frac{[HgL^{2+}]}{[CuL^{2+}]} * \frac{[Cu^{2+}]_{tot}}{[Hg^{2+}]_{tot}} \quad (13)$$

$$= \frac{K_{HgL}}{K_{CuL}} * 1 + \frac{K_{HgL}}{K_{CuL}} * \frac{1 + \frac{K_W}{[H^+]} * K_{CuOH} + \frac{K_W^2}{[H^+]^2} * K_{Cu(OH)_2}}{1 + \frac{K_W}{[H^+]} * K_{HgOH} + \frac{K_W^2}{[H^+]^2} * K_{Hg(OH)_2}}.$$

The $K_{ML}^{eff}$ and $K_{Hg/Cu}^{eff,sel}$ values were calculated from the literature values of $K_{MOH}$, $K_{M(OH)_2}$, and amine protonation constants (Smith et al., *Critical Stability Constants*, Plenum Press, New York, 1975). In those cases where several constants were reported, an average value was used. The Log $K_{CuH6Aza222}$ value and the H$_6$Aza222 protonation constant were referenced from the literature (De Santis et al., *A. Inorg. Chem.*, 1997, 36(10), p. 1998-2003), and the Log $K_{HgH6Aza222}$ value was obtained by the present measurements. The stability constants of L19-L25 were taken from the original publication where they were determined for 80% MeOH-20% H$_2$O solutions and used without adjustments to the aqueous solutions (Jones et al., *J. Chem. Soc., Chem. Comm.*, 1979, 3, p. 140-141). It was assumed that the polythioethers were not protonated over the pH range considered. All significant figures were carried out through the whole calculation processes and then rounded to the first decimal place. No error analysis was performed.

Table 1 illustrates the procedure used for the comparison of the ligands. Ligands L4, L7 and L18 were selected to demonstrate the general trends in changes of the effective stability constants as function of pH, and to show the macrocyclic effects on those constants.

TABLE 1

LogK$_{HgL}^{eff}$ and LogK$_{Hg/Cu}^{eff,sel}$ Values for Ligands L4, L7, and L18

| Ligand | L4 | | L7 | | L18 | |
|---|---|---|---|---|---|---|
| LogK$_{HgL}$ | 25.0 | | 25.5 | | 28.5 | |
| LogK$_{CuL}$ | | 20.1 | | 24 | | 18.1 |
| LogK$_{Hg/Cu}^{sel}$ | | 4.9 | | 1.5 | | 10.4 |
| pH | LogK$_{HgL}^{eff}$ | LogK$_{Hg/Cu}^{eff,sel}$ | LogK$_{HgL}^{eff}$ | LogK$_{Hg/Cu}^{eff,sel}$ | LogK$_{HgL}^{eff}$ | LogK$_{Hg/Cu}^{eff,sel}$ |
| 0 | −4.1 | 4.9 | 2.2 | 1.5 | −9.2 | 10.4 |
| 1 | −0.1 | 4.9 | 5.8 | 1.5 | −3.3 | 10.4 |
| 2 | 3.9 | 4.9 | 8.5 | 1.5 | 2.2 | 10.4 |
| 3 | 7.7 | 4.8 | 10.6 | 1.4 | 6.8 | 10.4 |
| 4 | 10.2 | 3.8 | 11.6 | 0.4 | 9.9 | 9.4 |
| 5 | 11.3 | 1.9 | 11.7 | −1.5 | 11.9 | 7.4 |
| 6 | 12.3 | −0.1 | 11.7 | −3.5 | 13.5 | 5.4 |
| 7 | 12.9 | −2.0 | 11.7 | −5.4 | 14.5 | 3.5 |
| 8 | 13 | −3.1 | 11.7 | −6.6 | 15.2 | 2.4 |
| 9 | 12.8 | −3.3 | 11.6 | −6.7 | 15.3 | 2.2 |
| 10 | 11.8 | −3.3 | 11.3 | −6.7 | 14.8 | 2.2 |
| 11 | 10.0 | −3.3 | 10.2 | −6.7 | 13.4 | 2.2 |
| 12 | 8.0 | −3.3 | 8.5 | −6.7 | 11.5 | 2.2 |
| 13 | 6.0 | −3.3 | 6.5 | −6.7 | 9.5 | 2.2 |
| 14 | 4 | −3.3 | 4.5 | −6.7 | 7.5 | 2.2 |
| $\sum_{pH=0}^{14}$ LogK | 119.7 | 0.2 | 138.1 | −50.9 | 133.5 | 82.9 |

As a general rule, the K$_{ML}^{eff}$ values are less than the stability constants K$_{ML}$ shown on the second row of Table 1. The effective stability constants reach their maximum values at pH values close to 7 and decrease in both acidic and basic regions because of amine protonation and metal hydrolysis, respectively. The sum of the Log K$_{HgL}^{eff}$ taken over fifteen pH values reflects the ligand performance in the solutions of different acidities.

The effective selectivity constant Log K$_{Hg/Cu}^{eff,sel}$ approaches the difference between logarithms of the stability constants of the corresponding mercury and copper complexes in the acidic solutions, when the concentration of both metal ions by far exceeds that of their hydrolyzed forms. Since mercury hydrolyzes more easily than copper, the values decrease with increasing pH and finally plateau at a high pH, when the dominant process for metal complexation becomes $$M(OH)_2 + L = ML^{2+} + 2OH^-. \quad (14)$$

The difference between Log K$_{Hg/Cu}^{eff,sel}$ values for the low and high pH is 8.2, and it is independent upon the ligand because it is determined by the hydrolysis constants of the metal ions. The sum of the Log K$_{Hg/Cu}^{eff,sel}$ values over the range of pH values represents the ligand's preference to mercury vs. copper on a broad acidity range.

It is instructive to compare the way two ligands—linear tetracoordinate L4 and cyclic tetracoordinate L7—change their Log K$_{HgL}^{eff}$ values with changing pH. The stability constants of both ligands are close, so that their Log K$_{HgL}^{eff}$ values differ by only 0.5 at high pH values (i.e., Log K$_{HgL}$=25.0 and 25.5, respectively). As the solutions become more acidic, concentration of free L7 decreases faster than that of L4, because L7 initially is protonated more easily than L7. Specifically, for L4, the first two protonation constants are Log $\beta_1$=9.8 and Log $\beta_2$=9.15, but Log $\beta_1$=10.97 and Log $\beta_2$=9.87 for L7. As a result, the effective stability constant for L4 exceeds that of L7 as the pH decreases from 10 to 6. However, when the pH decreases even further, the effective stability constants reverse again. The reason for this phenomenon is the protonation of the additional nitrogens in L4 (Log $\beta_3$=6.7 and Log $\beta_4$=3.48) which is helped by the ligand's unfolding process that increases the distance between positive charges and allows more protons to come into proximity of the amine sites. This unfolding does not happen substantially in L7 and, as a result, its last protonation constants (Log $\beta_3$=1.6 and Log $\beta_4$=0.8) are substantially lower than those of L4. As a consequence, at lower pH values, L7 turns out to be much better ligand than L4. This analysis illustrates that an increase in the number of cycles in a polyamine ligand can increase its effective stability constant. The bicyclic nature of H$_6$Aza222, therefore, provides an advantage in efficiently binding mercury, in comparison with other ligands.

The sums of Log K$_{HgL}^{eff}$ and Log K$_{Hg/Cu}^{eff,sel}$ calculated as above for L1-L18 are presented in the Table 2. The $\Sigma$Log K$_{HgL}^{eff}$ value for H$_6$Aza222 (L18) is exceeded by the corresponding values of L6, L7, L13, L14, and L16; closely matches that of L10; and, is approached by that of L4, L5, L9 and L15. From this list, only L4 and L6 are available commercially at a reasonable price, L5 is somewhat expensive, and the other amines are either too expensive or are not available commercially. Thus, L4 and L6 would be suitable precursors for the synthesis of chelating resins for non-selective metal sequestration purposes.

Table 2 also shows sums of Log K$_{Hg/Cu}^{eff,sel}$ values for the same ligands summarized over fifteen pH values. Its value for H$_6$Aza222 (82.9) by far exceeds that of the second bests L9 and L16

$$\left(\sum_{pH=0}^{14} K_{Hg/Cu}^{eff,sel} = 39.2\right)$$

which demonstrates that H$_6$Aza222 clearly outperforms other polyamines in its selectivity for mercury cations.

TABLE 2

$LogK_{HgL}^{eff}$ and $LogK_{Hg/Cu}^{eff,sel}$ Values for Ligands L1-L18

| Ligand | $LogK_{HgL}$ | $LogK_{CuL}$ | $Log\frac{K_{HgL}}{K_{CuL}}$ | $\sum_{pH=0}^{14} LogK_{HgL}^{eff}$ | $\sum_{pH=0}^{14} LogK_{Hg/Cu}^{eff,sel}$ | Max pH for $LogK_{Hg/Cu}^{eff,sel} \leqq 3.3$ |
|---|---|---|---|---|---|---|
| L1 | 8.8 | 4.2 | 4.6 | −38 | −4.9 | 4 |
| L2 | 14.3 | 10.5 | 3.8 | 8.8 | −16.9 | 3 |
| L3 | 21.8 | 15.9 | 5.9 | 94.1 | 15.2 | 4 |
| L4 | 25 | 20.1 | 4.9 | 119.7 | 0.2 | 4 |
| L5 | 25.8 | 18.5 | 7.3 | 120 | 36.2 | 5 |
| L6 | 27.7 | 22.8 | 4.9 | 138.6 | 0.2 | 4 |
| L7 | 25.5 | 24 | 1.5 | 138.1 | −50.9 | — |
| L8 | 20.5 | 17.1 | 3.4 | 1.3 | −21.7 | 3 |
| L9 | 29.6 | 22.1 | 7.5 | 128.5 | 39.2 | 5 |
| L10 | 25.3 | 29.1 | −3.8 | 133 | −130.3 | — |
| L11 | 23 | 26.9 | −3.9 | 84 | −131 | — |
| L12 | 23.7 | 24.4 | −0.7 | 86.0 | −83.8 | — |
| L13 | 28.5 | 28.3 | 0.2 | 168.1 | −70.3 | — |
| L14 | 27.4 | 27.1 | 0.3 | 146.1 | −68.8 | — |
| L15 | 26.5 | 23.8 | 2.7 | 124 | −32.8 | — |
| L16 | 29.1 | 21.6 | 7.5 | 160.9 | 39.2 | 5 |
| L17 | 17.9 | 15.7 | 2.2 | 59.0 | −39.5 | — |
| L18 | 28.5 | 18.1 | 10.4 | 133.5 | 82.9 | 7 |

The National Primary Drinking Water Regulations (NPDWRs or primary standards) enforced by EPA are 1.3 mg/L (i.e., $2 \times 10^{-5}$ M) for Cu and 0.002 mg/L (i.e., $1 \times 10^{-8}$ M) for Hg. Thus, in order to reduce the mercury concentration to levels below that enforced by the primary standards (i.e., $1 \times 10^{-8}$ M) in a solution which already has copper at the highest level of a contaminant allowed in drinking water (i.e., $2 \times 10^{-5}$ M), the logarithm of the effective selectivity constant Log $K_{Hg/Cu}^{eff,sel}$ of the corresponding ligand should exceed $$Log\frac{2*10^{-5}}{10^{-8}} = 3.3.$$

As is evident from Table 2, the corresponding pH threshold value for $H_6Aza222$ is 7; at pH=8 the Log $K_{Hg/Cu}^{eff,sel}$ is reduced to 2.4. Accordingly, within the scope of the applied model, an $H_6Aza222$-based polyazacrown polymer can reduce down mercury concentrations to those required by the primary standards at pH$\leqq$7.

The last column in the Table 2 shows the highest threshold pH values at which the Log $K_{Hg/Cu}^{eff,sel}$ value of the corresponding ligand still exceeds 3.3. $H_6Aza222$ clearly leads, and is followed by L5 (commercially available, but still costly) and the commercially unavailable L9 and L16.

Table 3 presents a similar comparison for the L18 ligand and the L19-L25 polythioethers. Since the stability constants of the corresponding copper complexes were unavailable, only the effective stability constants for mercury were calculated and compared with those of $H_6Aza222$.

TABLE 3

$LogK_{HgL}^{eff}$ Values for Ligands L18-L25

| | Ligand | | | | | | | |
|---|---|---|---|---|---|---|---|---|
| | L19 | L20 | L21 | L22 | L23 | L24 | L25 | L18 |
| | | | | $LogK_{HgL}$ | | | | |
| | 9.6 | 9.3 | 10.5 | 8.9 | 7.9 | 12.0 | 11.8 | 28.5 |
| pH | $LogK_{HgL}^{eff}$ | $LogK_{HgL}^{eff}$ | $LogK_{HgL}^{eff}$ | $LogK_{HgL}^{eff}$ | $LogK_{HgL}^{eff}$ | $LogK_{HgL}^{eff}$ | $LogK_{HgL}^{eff}$ | $LogK_{HgL}^{eff}$ |
| 0 | 9.6 | 9.3 | 10.5 | 8.9 | 7.9 | 12 | 11.8 | −9.2 |
| 1 | 9.6 | 9.3 | 10.5 | 8.9 | 7.9 | 12 | 11.8 | −3.3 |
| 2 | 9.6 | 9.3 | 10.5 | 8.9 | 7.9 | 12 | 11.8 | 2.2 |
| 3 | 9.5 | 9.3 | 10.4 | 8.8 | 7.8 | 11.9 | 11.8 | 6.8 |
| 4 | 8.5 | 8.3 | 9.4 | 7.8 | 6.8 | 10.9 | 11.7 | 9.9 |
| 5 | 6.6 | 6.3 | 7.5 | 5.9 | 4.9 | 9.0 | 8.8 | 11.9 |
| 6 | 4.6 | 4.3 | 5.5 | 3.9 | 2.9 | 7 | 6.8 | 13.5 |
| 7 | 2.6 | 2.3 | 3.5 | 1.9 | 0.9 | 5 | 4.8 | 14.5 |
| 8 | 0.6 | 0.3 | 1.5 | −0.1 | −1.1 | 3 | 2.8 | 15.2 |
| 9 | −1.5 | −1.7 | −1 | −2.1 | −3.1 | 1 | 0.8 | 15.3 |
| 10 | −3.5 | −3.7 | −3 | −4.1 | −5.1 | −1 | −1 | 14.8 |
| 11 | −5.5 | −5.7 | −5 | −6.1 | −7.1 | −3 | −3 | 13.4 |
| 12 | −7.5 | −7.7 | −7 | −8.1 | −9.1 | −5 | −5 | 11.5 |
| 13 | −9.5 | −9.7 | −9 | −10 | −11.1 | −7 | −7 | 9.5 |
| 14 | −11 | −12 | −11 | −12 | −13.1 | −9 | −9 | 7.5 |

The first difference between $H_6Aza222$ and polythioethers is the magnitude of the stability constant of their mercury complexes: Log $K_{HgL}$=28.5 for $H_6Aza222$ vs. 12.0 for L12. However, the large value of this constant allows polyamines to bind mercury more efficiently than the polythioethers only in neutral and alkaline solutions, when substantial amounts of the polyamine are present in their non-protonated form. On the contrary, the effective stability constants of polythioethers with mercury decrease with increasing pH because hydroxide ions win the competition for mercury cations over the ligands under those conditions. Ultimately, when polyamines become virtually completely deprotonated (pH=14), the difference between the effective stability constants of all ligands in this analysis become equal to the difference between the stability constants of the corresponding species. The effective stability constants for $H_6Aza222$ and L24 match in the pH region 4-5, meaning that polythioethers could be preferred materials for mercury removal in acidic solutions, while polyamines could absorb mercury more efficiently in neutral and basic solutions.

The foregoing analysis demonstrates the ability of $H_6Aza222$ to bind $Hg^{2+}$ under different pH values matching or exceeding that of other ligands. Further, $H_6Aza222$ has a much greater selectivity for mercury compared to that of copper in comparison with other amines.

Example 2

Synthesis of Polyazacrown Polymers

Various linking agents were reacted with $H_6Aza222$ under varying conditions (e.g., temperature, neutralizing base, solvent), and the resulting azacrown structures were analyzed.

Polyazacrown polymers of different physical and chemical properties have been successfully synthesized by reaction of $H_6Aza222$ with various linking agents in various solvents such as water, ethylene glycol, DMF, DMA, benzyl cyanide, mineral oil, and decalin at temperatures varying from 0° C. to 220° C.

For example, reaction of $H_6Aza222$ with 1,2-dibromoethane yielded polymers in limited circumstances. When reacted in DMF in the presence of non-nucleophilic bases, a polyazacrown polymer structure was not formed. Only mixtures of various substituted amines were identified among the products. Similarly, a reaction mixture of $H_6Aza222$, 1,2-dibromoethane, and $K_2CO_3$ in MeCN only formed additional two-carbon linkages between adjacent nitrogen atoms in a single azacrown monomer, and did not yield a polyazacrown polymer structure. However, when water was used as a solvent, $H_6Aza222$ with 1,2-dibromoethane yielded a gel polymer that could be useful in some applications, notwithstanding its relatively weak mechanical properties. Similarly, reaction of $H_6Aza222$ with the linking agent $XCH_2(-CH_2OCH_2-)_nCH_2X$ (where X=Cl, I, OTs, and n=1-3), yielded voluminous gels of relatively low mechanical strength.

Figure 5A:
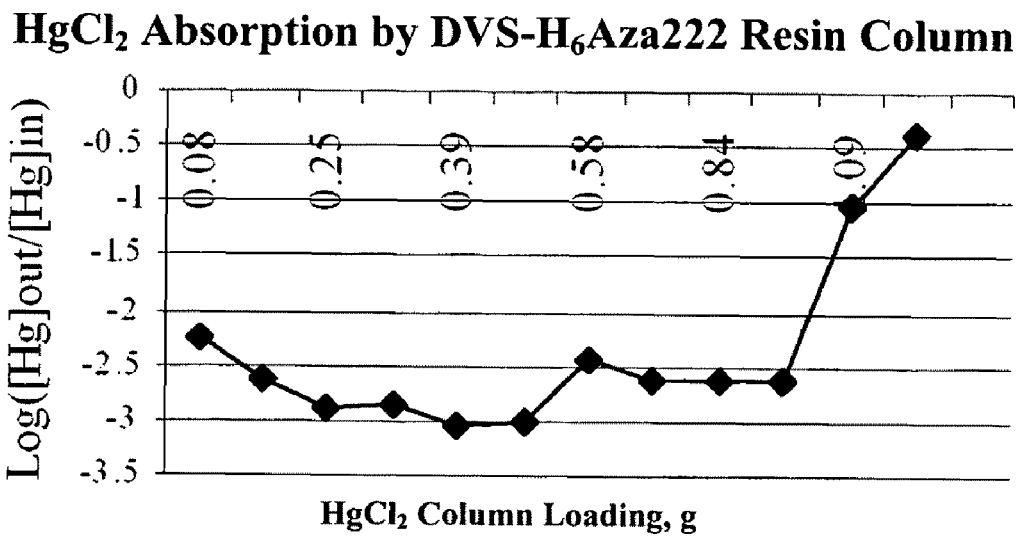
FIGS. 5a and 5b illustrates the absorption efficiency of a networked polyazacrown polymer according to the disclosure for mercury.

Complexing polymer suspensions were prepared by the reaction of divinylsulfone (DVS) with $H_6Aza222$ at room temperature or below in protic solvents. The resulting DVS-$H_6Aza222$ polyazacrown polymer formed a solid resin and was tested as a mercury-absorption medium. However, the DVS-$H_6Aza222$ resin was soluble in acid, even weak acids such as acetic acid. FIG. 5a illustrates the absorption of mercury from an aqueous $HgCl_2$ solution by the DVS-$H_6Aza222$ resin in a column. FIG. 5a illustrates that the mercury concentration in the eluent decreased by about 2 to about 3 orders of magnitude until the column was saturated. The weight of the $HgCl_2$ absorbed by the column at the saturation point (i.e., about 1.1 g) exceeded the weight of the polymer and corresponded to a molar ratio of $HgCl_2$ retained per azacrown moiety in the column of about 4:1. Column regeneration via an acid column wash was not attempted because of the resin's solubility in acid. However, a water-soluble sulfide salt wash (e.g., aqueous $Na_2S$ or $(NH_4)_2S$) would have been possible.

Reactions between $H_6Aza222$ and either of 1,4-di-chloromethyl benzene and/or 4,4'-bis(chloromethyl)-1,1'-biphenyl yielded, strong, mechanically and chemically robust solid polyazacrown polymer resins using any of a variety of solvents, including DMF, DMA, benzyl cyanide, mineral oil, and decalin at reaction temperatures ranging from about 100° C. to about 220° C. Neutralizing bases (N,N-diisopropyl-N-ethyl amine (or Hünig's base), N,N-diisopropyl-N-ethanol amine, and N,N-dicyclohexyl-N-methyl amine) were employed to bind the hydrogen chloride released during the course of alkylation. N,N-dicyclohexyl-N-methyl amine was preferable because of the high volatility of the Hunning's base at the reaction conditions (b.p.=127° C.), while N,N-diisopropyl-N-ethanol amine was found to react with 1,4-dichloromethyl benzene at elevated temperatures (i.e., probably via alkylation of the hydroxyl groups).

In some embodiments, azacrown monomers were also functionalized prior to reaction with a linking agent. For example, the reaction of $H_6Aza222$ with a 25% aqueous solution of sodium vinylsulfonate yielded ($NaO_3S-CH_2CH_2-$)$_n$$H_{6-n}$Aza222, and the functionalized monomer was then polymerized by heating with a 4,4'-bis(chloromethyl)-1,1'-biphenyl linking agent to yield a polymer containing negatively charged ethyl sulfonate groups, as indicated by IR analysis. These negatively charged groups were added to compensate for the positive charge of a mercury cation and thus increase the stability of complex formed therewith.

Polyazacrown polymers were also formed using various leaving groups. For example, p-xylylene bis(tetramethylenesulfonium perchlorate) (i.e., the perchlorate salt of Formula VIII above) was first synthesized by refluxing 1,4-di-chloromethyl benzene with tetrahydrothiophene and sodium perchlorate in acetonitrile. Then, a solution of $H_6Aza222$ and α,α'-bis(tetramethylenesulfonium)dichloro-p-xyleneperchlorate in N-methylpyrrolidone was added dropwise to hot (210° C.) mineral oil containing N,N-dicyclohexyl-N-methyl amine. Because of the low solubility of the sulfonium-based linking agent in the mineral oil medium (i.e., as compared to the solubility of 1,4-di-chloromethyl benzene), the goal was to form small (approximately 0.1 mm diameter) polymer beads from the added drops by conducting the polymerization only in the discrete droplet volume. However, the polymerization reaction proceeded slowly, forming in a bulk polymerized mass resulting from coalesced reactant droplets. In any event, this process could still be used to generate polymer beads, if the reaction parameters were altered appropriately (e.g., by increasing the mineral oil temperature, increasing the residence time in the mineral oil bath prior to droplet aggregation).

The formed polyazacrown polymers were found to have an affinity for binding $Hg^{2+}$. For example, the polyazacrown polymers are able to absorb $Hg^{2+}$ not only from $HgCl_2$, but also from a $K_2HgI_4$ solution in 0.1 M NaI. Given the high stability constants of the $HgI_4^{2-}$ and the $HgI_3^-$ ions (i.e., pK=29.8±0.1 and 27.6±0.1, respectively) and the ability of the polyazacrown polymers to nonetheless bind the same, the polyazacrown polymers have a substantial capacity for use as a mercury-removal medium.

Figure 3:
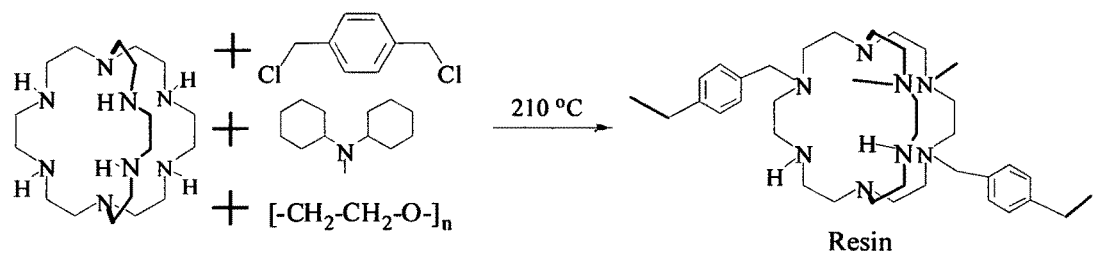
FIG. 3 illustrates a method of synthesizing a networked polyazacrown polymer according to the disclosure.

A preferred reaction scheme that yielded highly chemically stable and mechanically robust polyazacrown polymers of H₆Aza222 that were used in many of the following Examples is shown in FIG. 3. The scheme includes 1,4-dichloromethyl benzene as a linking agent, N,N-dicyclohexyl-N-methyl amine as a neutralizing base, and PEG as a structure-directing agent.

Figure 4:
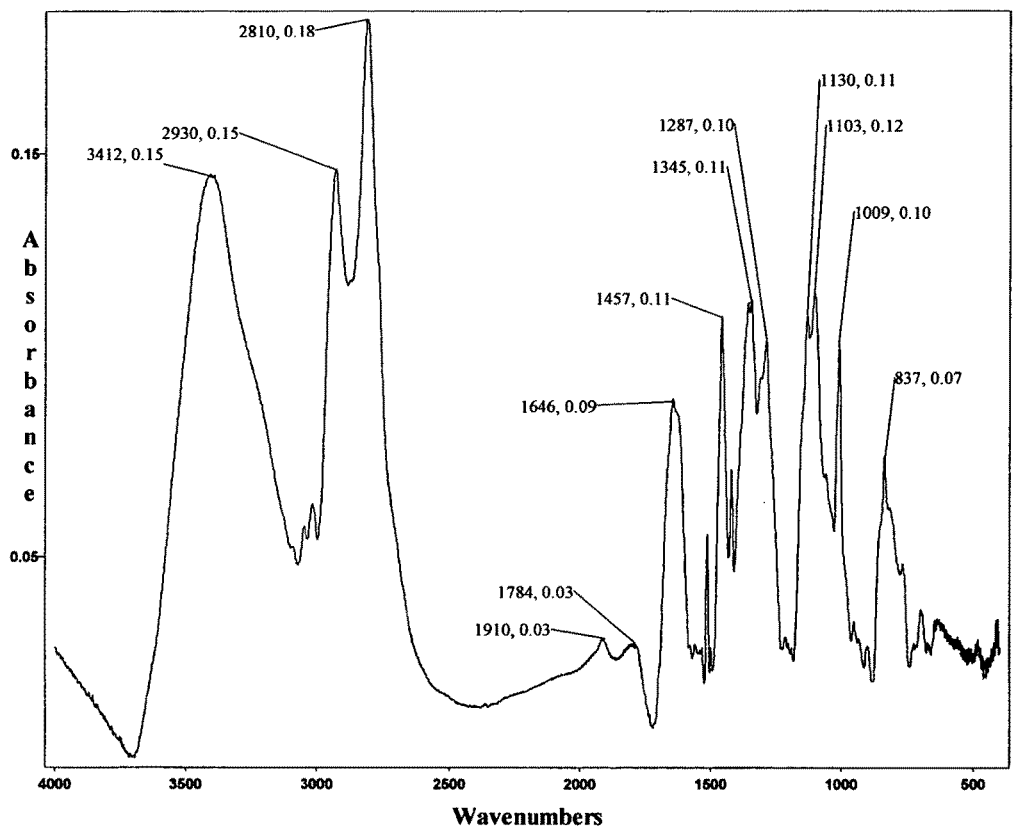
FIG. 4 is an IR spectrum of a networked polyazacrown polymer according to the disclosure.

The IR spectrum of the resulting polyazacrown polymer resin is shown in FIG. 4. The 3412 cm$^{-1}$ peak in the IR spectrum indicates the presence of N—H bonds (i.e., at least some amino-hydrogens remain in the final polyazacrown polymer). This is illustrated in FIG. 3 by the presence of two amino-hydrogens and four alkylated nitrogens. The fact that not all of six amino-hydrogens were substituted correlates well with the increasing difficulty in H₆Aza222 alkylation reactions as a function of the number of nitrogens that have already been substituted. For example, the reaction of H₆Aza222 with methyl iodide (MeI) proceeds only to the stage of formation of Me₄H₂Aza222 (Farrell et al., *Dalton Transactions*, 2006, 26, p. 3204-3211). Thus, it is understandable that bulkier linking agent substituents may not react with all six of the amino-hydrogens in the H₆Aza222 monomer.

Example 3

Synthesis and Mercury Absorption of Bulk Polyazacrown Polymer

H₆Aza222.4H₂O (0.422 g, 1 mmol), 1,4-di-chloromethyl benzene (0.517 g, 3 mmol) and N,N-diisopropyl-N-ethyl amine (0.781 g, 6 mmol) were dissolved in 5 mL DMF and held at 160° C. for 30 min while the polymerization reaction proceeded. The resulting polyazacrown polymer resin was manually ground using a mortar and pestle, rinsed with water, and dried. The process yielded 1.23 g of a bulk, networked polyazacrown polymer that was insoluble in all solvents, did not melt, did not have a glass transition temperature, and had a thermal decomposition temperature greater than 200° C. The additionally yielded mass beyond that of the added azacrown monomer and linking agent was likely due to residual amine base and/or solvent retained in the final resin. The resin had a density of about 1 g/cm³, being slightly denser than water.

The bulk, ground polyazacrown polymer (800 mg) was then loaded into a 2-mL column to test the ability of the resin to absorb mercury. A solution of HgCl₂ (240 mL of a 1.00 wt. % solution containing 2400 mg HgCl₂) was passed through the column, and then the column was rinsed with 640 mL deionozed (DI) H₂O. Fifty-five fractions of the eluted fluids (i.e., 880 mL fed fluid less any column retentate) were collected and analyzed for mercury. The mercury concentration measurements were plotted as function of the eluted fluid volume. Then, the column was rinsed with 100 mL of 1M HCl column followed by 400 mL DI H₂O, and the concentration of mercury in the eluent was determined. The foregoing column rinses and the corresponding mercury balance (i.e., and determined by analysis of the different eluents) is summarized in Table 3 below.

TABLE 3

Mercury Balance for Absorption by Bulk Polyazacrown Polymer

| Solution | HgCl₂ In (mg) | HgCl₂ Out (mg) | HgCl₂ Retained (mg) |
| --- | --- | --- | --- |
| 1. 240 mL HgCl₂ | 2400 | 1950 | 450 |
| 2. 640 mL DI H₂O | 0 | 262 | 188 |
| 3. 100 mL HCl and 400 mL DI H₂O | 0 | 50 | 138 |

Figure 5B:
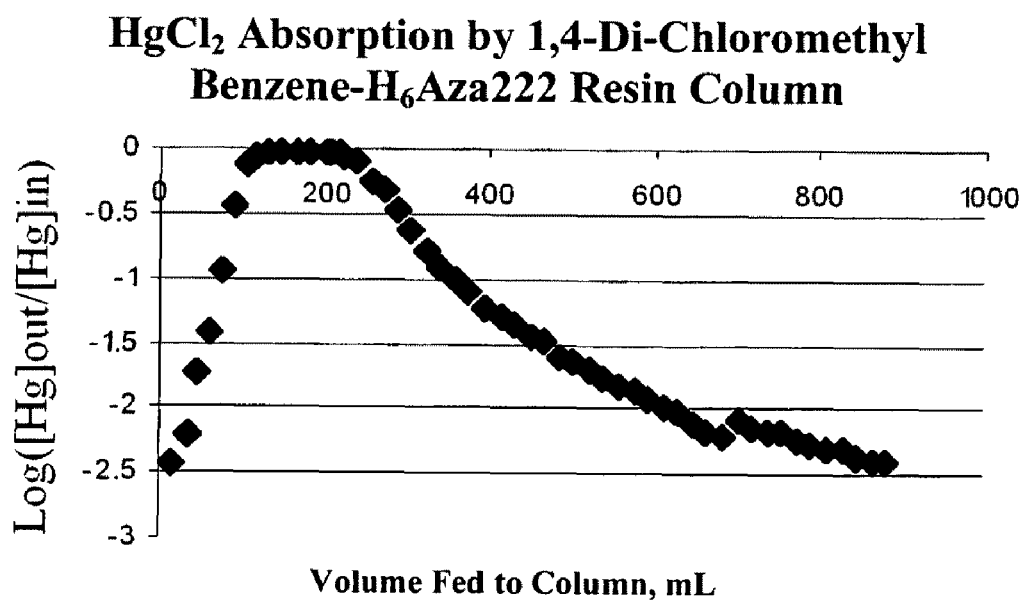

FIG. 5b illustrates that the concentration of HgCl₂ in the eluent continued to increase as the solution was passed through the column filled with the bulk, manually ground resin. The eluent concentration increased until the column was saturated and the concentration of the effluent reached the same concentration as the feed. Saturation occurred at about 100 mL, at which time about 450 mg HgCl₂ had been absorbed, and the remaining 1950 mg of HgCl₂ present in the 1.00 wt. % HgCl₂ feed passed through the column into the eluent. The ratio of $[Hg]_{out}/[Hg]_{in}$ was generally lower than that observed for the DVS-H₆Aza222 resin column described above (Example 2 and FIG. 5a). No well-defined breakthrough point was observed in the experiment, which can be explained by the slowness of diffusion of the HgCl₂ molecules into the bulk polymeric material, leading to poor overall binding kinetics. The absorbed amount of 450 mg HgCl₂ corresponds to 1.4 moles of mercury cations absorbed per mole of Aza222 ligand sites, assuming the resin composition to be represented by $((C_8H_8)_3Aza222)_n$ (i.e., given the 3:1 reaction stoichiometry and assuming complete alkylation). Mercury is expected to be absorbed by the resin according to the equation $$HgCl_2 + L \rightarrow HgL^{2+} + 2Cl^-. \tag{15}$$

The deviation in the amount of absorbed mercury relative to the expected amount (i.e., an apparent absorption efficiency of 140%) indicates that other mechanisms for mercury retention could be involved. A probable mechanism of this process seems to include complexation with chloride anions:

$$2HgCl_2 + L \rightarrow HgL^{2+} + Cl^- + HgCl_3^- \tag{16}$$

and physical dissolution of HgCl₂ in the resin material in a molecular form. The complexation of chloride ions by HgCl₂ molecules

$$\left( \frac{[HgCl_3^-]}{[HgCl_2][Cl^-]} \approx 7 \right)$$

and low dissociation constant of HgCl₂

$$\left( \frac{[Hg^{2+}][Cl^-]^2}{[HgCl_2]} = 10^{-13.5} \right)$$

support these hypotheses (Smith et al., *Critical Stability Constants*, Plenum Press, New York, 1975).

As indicated in Table 3, the total amount of HgCl₂ eluted with the 640 mL of DI H₂O was 262 mg. The substantial removal of mercury when rinsing with solution #2 suggests that much of the initially absorbed 450 mg HgCl₂ was only weakly bound to the resin, likely not being trapped within the Aza222 cages. Correspondingly, 188 mg HgCl₂ was strongly bound to the resin, meaning that about 59% of the resin binding sites were occupied. As FIG. 5b shows, the mercury effluent concentration was slowly decreasing, and mercury was still being released from the resin even at the end of the DI H₂O rinse, indicating that perhaps even more mercury could have been released with subsequent water rinsing. The additional rinse with solution #3 released an additional 50 mg $HgCl_2$, leaving 138 mg $HgCl_2$ on the column.

Overall, the processes of both mercury absorption and desorption were sluggish and rather unquantitative. This may be the result of the slow diffusion of mercury-containing species both into and out of the coarse, ground bulk resin material used to fill the column.

A notable phenomenon that was observed was the slowing of the liquid flow during mercury absorption experiments. At the beginning of the experiment, the volumetric flow rate was 0.85 cm³/min. By the time the last portions of the fluid were passed, the volumetric flow rate decreased to 0.012 cm³/min. This 70-fold decrease in flow could be due to resin expansion resulting from mercury chloride uptake.

Example 4

Synthesis and Mercury Absorption of Microporous Polyazacrown Polymer

A mixture of $H_6Aza222.4H_2O$ (10.45 g, 23.6 mmol), 1,4-di-chloromethyl benzene (12.41 g, 71 mmol), N,N-dicyclohexyl-N-methyl amine (30.00 g, 154 mmol) and PEG-600 (33.0 g) were placed into a 100 mL flask, stirred, and heated to 120° C. under a nitrogen atmosphere, and then held at 120° C. for 20 min to form a polyazacrown polymer resin. The flask was cooled to room temperature, and the resin was ground into pieces approximately 1 cm³ in size. The resin was subsequently re-heated to 200° C. in the same flask for 30 min under a nitrogen atmosphere, and then re-cooled to room temperature for 3 hr. The resin was removed from the flask, further manually ground using a mortar and pestle, placed onto a fritted glass filter, and sequentially washed with: 200 mL isopropanol, 200 mL of DI water, 500 mL 1M aqueous NaOH, 500 mL DI water, 200 mL isopropanol, and then 200 mL hexane. The wash process removed the PEG-600 structure-directing agent to convert the polyazacrown polymer resin to a microporous structure. The resulting product was dried on a filter for 1 hr and then held under a vacuum for 24 hr. The dried microporous structure had a porosity of about 0.7 to about 0.8, corresponding to a bulk density of about 0.2 g/cm³ to about 0.3 g/cm³ (with an estimated bulk density of about 0.24 g/cm³).

The process yielded 9.18 g (i.e., 57%) a microporous, networked polyazacrown polymer that was insoluble in all solvents, did not melt, and did not have a glass transition temperature. CHN analysis of the product indicated an elemental composition of C: 68.35%, H: 8.60%, and N: 12.42% (cf. calculated values of C 74.52%, H 8.93%, N 16.55% for $C_{42}H_{60}N_8$ (i.e., $(C_8H_8)_3Aza222$). The difference between calculated and measured elemental compositions can be the result of several factors, for example including incomplete alkylation (i.e., linking agents that only react with one azacrown monomer and retain a leaving group), entrapment of reactants (N,N-dicyclohexyl-N-methyl amine and/or PEG-600), or incomplete removal of solvents that were used to rinse the resin after the synthesis.

The microstructure of the networked polyazacrown polymer resin is illustrated by the SEM images of FIGS. 6a-6e. The figures illustrate that the resin includes of spherical particles having a diameter of about 1 μm affixed to each other. The resin has a Brunauer-Emmett-Teller (BET) surface area of about 3.6 m²/g. The surface area is consistent with a microporous resin structure that primarily includes approximately 1 μm-diameter, interconnected particles having about 60% of their surface exposed. The formation of the microstructure is believed to be caused by phase separation of the newly formed polymer from the PEG-600 structure-directing agent.

The microporous polyazacrown polymer (66 mg) was then loaded into a 0.4 mL column to test the ability of the resin to absorb mercury. Aqueous solutions of $HgCl_2$ (0.39 wt. %) and $Na_2S$ (saturated) were passed through the column in alternate cycles. The column was rinsed with DI water between the $HgCl_2$ and $Na_2S$ washes to remove any excess electrolytes, thus preventing the formation of HgS due to rinse solution cross-mixing. The eluted solutions were diluted to 100 mL in a volumetric flask and analyzed for mercury content by AA. After the end of the experiment the resin was digested in aqua regia and analyzed for mercury content.

The concentration of $HgCl_2$ in the stock solution was chosen to ensure that the amount of mercury a 5 mL aliquot (i.e., 19.6 mg $HgCl_2$ or 14.3 mg $Hg^{2+}$ (53 μmol)) stays below the estimated capacity of the resin (i.e., about 26.5 mg $HgCl_2$ or 19.6 mg $Hg^{2+}$). The amount of $Na_2S$ in a 5 mL stock solution aliquot (i.e., about 1 g, about 13 mmol) by far exceeded the amount necessary to bind mercury and to prevent possible HgS precipitation. The concentration of mercury in the eluted solutions was measured, and the amount of mercury remaining on the column was calculated according to a mass balance. The mercury balance for the foregoing column rinses is summarized in Table 4 below. In Table 4, the listed values for mercury fed to the column (i.e., 12.9±1.3 mg) deviate from the gravimetrically determined value of mercury fed (i.e., 14.3 mg), because the tabulated values were determined analytically by AA, thus incorporating some measurement error.

TABLE 4

Mercury Balance for Absorption by and Regeneration of Microporous Polyazacrown Polymer

| Solution | $Hg^{2+}$ In (mg) | $Hg^{2+}$ Out (mg) | $Hg^{2+}$ Retained (mg) |
| --- | --- | --- | --- |
| 1. 5 mL $HgCl_2$ | 12.9 ± 1.3 | 0 | 12.9 ± 1.3 |
| 2. 5 mL DI $H_2O$ | 0 | 0 | 12.9 ± 1.3 |
| 3. 6 mL $Na_2S$ and 7 mL DI $H_2O$ | 0 | 9.7 ± 1.0 | 3.2 ± 1.6 |
| 4. 5 mL $HgCl_2$ | 12.9 ± 1.3 | 0 | 16.1 ± 2.1 |
| 5. 5 mL DI $H_2O$ | 0 | 0 | 16.1 ± 2.1 |
| 6. 5 mL $Na_2S$ | 0 | 10.6 ± 1.0 | 5.5 ± 2.3 |
| 7. 5 mL DI $H_2O$ | 0 | 0.9 ± 0.1 | 4.6 ± 2.3 |
| 8. 5 mL $HgCl_2$ | 12.9 ± 1.3 | 0 | 17.5 ± 2.6 |
| 9. 5 mL DI $H_2O$ | 0 | 0 | 17.5 ± 2.6 |
| 10. 5 mL $Na_2S$ | 0 | 16 ± 1.6 | 1.5 ± 3.1 |
| 11. 5 mL DI $H_2O$ | 0 | 0 | 1.5 ± 3.1 |
| 12. 5 mL $HgCl_2$ | 12.9 ± 1.3 | 0 | 14.4 ± 3.4 |
| 13. 5 mL DI $H_2O$ | 0 | 0 | 14.4 ± 3.4 |
| 14. 5 mL $Na_2S$ | 0 | 13.9 ± 1.4 | 0.5 ± 3.6 |
| 15. 5 mL DI $H_2O$ | 0 | 0.4 ± 0.04 | 0.1 ± 3.6 |

The results demonstrate that the column absorbed virtually all the mercury salt that passed through it and decreased the metal concentration in the eluent to an undetectable level. For example inlet concentrations of $Hg^{2+}$ of about 2860 mg/L (i.e., 14.3 mg $Hg^{2+}$ per 5-mL aliquot) were reduced to less than 60 mg/L (i.e., the detection limit of the mercury analysis, accounting for the eluent dilution), which represents a concentration reduction factor of about 50 or more. Further, the column was successfully regenerated with at least 50% efficiency with the $Na_2S$ solution in the intermediate cycles, and the regeneration was about 90% complete by the end of the fourth cycle. The measured mercury content in the resin by the end of the experiment (i.e., as determined by digestion of the resin itself, and not by calculation of the column mass balance as presented in Table 4) was 1.6 mg (i.e., about 2.4 wt. % of the resin), which correlated well with the value in Table 4 and demonstrated that $Na_2S$ was able to remove about 90% of the mercury from the column. The results demonstrate the regenerability of the $H_6Aza222$-based polyazacrown polymer resin, implying that the resin can be used in successive mercury remediation cycles without generating an additional waste stream for the absorption medium.

Example 5

Mercury Absorption of Microporous Polyazacrown Polymer and Silica Blend

Figure 7:
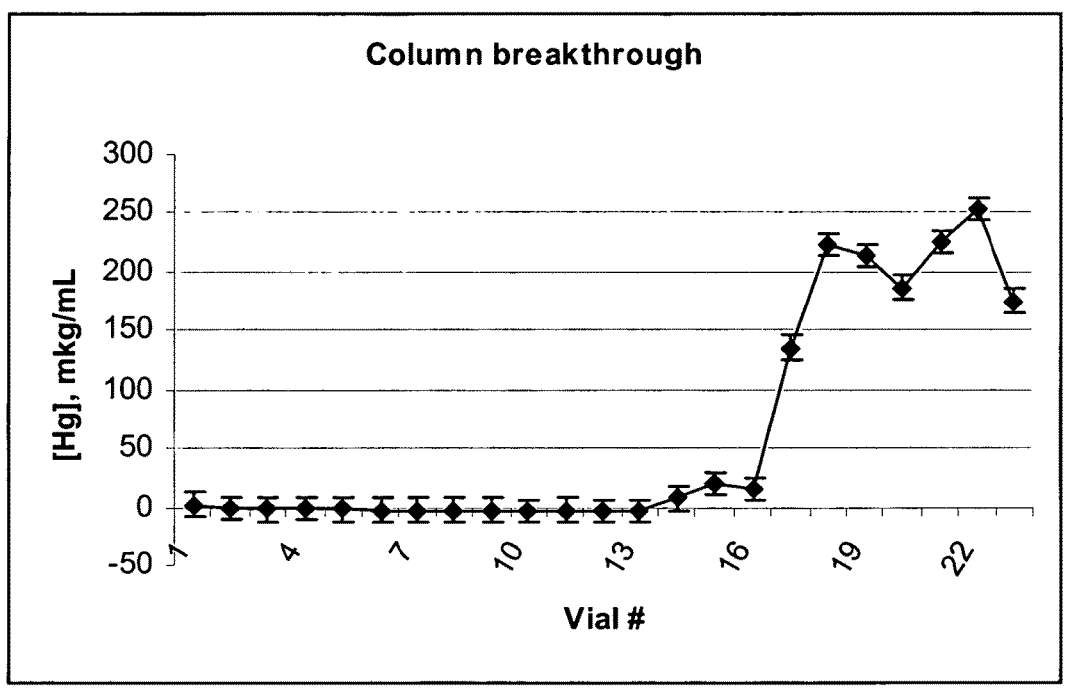
FIG. 7 illustrates the mercury absorption and retention efficiency of a mixture of silica and a networked polyazacrown polymer according to the disclosure, as a function of column eluent volume.

To avoid column clogging, the microporous polyazacrown polymer resin (62 mg) of Example 4 was ground with mortar and mixed with 540 mg Celite-545 silica. The obtained mixture was loaded into a 2-mL column and a solution of $HgCl_2$ (99 mg/250 mL) was passed through the column in 10 mL aliquots. As a result of the mixture with silica, the volumetric flow rate of the $HgCl_2$ solution did not noticeably decrease throughout the experiment. The eluent was collected in 20 mL vials, and the mercury content of each 10 mL aliquots was determined by AA analysis. FIG. 7 shows the mercury concentration (in µg/mL, or "mkg/mL" as shown in the figure) in the eluent as a function of vial number.

According to estimations, a 1:1 molar ratio of bound $Hg^{2+}$ to Aza222 azacrown moieties corresponded to about 63 mL (i.e., 6 vials) of the mercury solution. However, the mercury concentration of the eluent reached detectable levels only after 140 mL of the feed solution passed through the column. This result implies that about 55% of the mercury cations were absorbed by a mechanism other than coordination to azacrown moieties. The physical dissolution of mercury chloride in the resin and formation of trichloride anions (i.e., $HgCl_3^-$), as in Example 3, is thought to be responsible for the observed phenomena.

The microstructure of the resin appeared to play a role in mercury absorption, as compared to the bulk absorption test described above in the Example 3. No mercury was detected in the initial series of the eluent aliquots (i.e., vials 1-14). The eluent concentration rose to detectable levels when 30 mL more of the mercury solution was rinsed through the column. However, the eluent concentration was still below 7% of the concentration in the starting solution. Only after this additional 30 mL did the eluent concentration rise to 50-85% of the initial mercury concentration.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

Throughout the specification, where the compositions, processes, or apparatus are described as including components, steps, or materials, it is contemplated that the compositions, processes, or apparatus can also comprise, consist essentially of, or consist of, any combination of the recited components or materials, unless described otherwise. Combinations of components are contemplated to include homogeneous and/or heterogeneous mixtures, as would be understood by a person of ordinary skill in the art in view of the foregoing disclosure.

What is claimed is:

1. A polyazacrown polymer comprising:
   linked azacrown moieties of the formula $C_{18}H_{36}N_8L_xR_{6-x}$, wherein:
   L is one or more linking units derived from one or more linking agents having two or more leaving groups;
   R is one or more of hydrogen (H), a functionalizing moiety, and combinations thereof; and,
   x ranges from 2 to 6.

2. The polyazacrown polymer of claim 1, wherein R consists of hydrogen (H).

3. The polyazacrown polymer of claim 1, wherein:
   the linking agents comprise hydrocarbon-based chains being 2 or more atoms in length; and,
   the leaving groups are selected from the group consisting of vinyl groups, epoxides, halogens, tosyl groups, tetrahydrothiophenes, sulfonic acids, nitriles, and combinations thereof.

4. The polyazacrown polymer of claim 3, wherein the linking agents are selected from the group consisting of 1,4-di-chloromethyl benzene, 4,4'-bis(chloromethyl)-1,1'-biphenyl, and combinations thereof.

5. The polyazacrown polymer of claim 1, wherein x is more than 2 and the polyazacrown polymer is a network polymer.

6. The polyazacrown polymer of claim 5, wherein x is about 3 or more.

7. The polyazacrown polymer of claim 1, wherein the polyazacrown polymer has a microporous structure.

8. The polyazacrown polymer of claim 7, wherein the microporous structure has a porosity ranging from about 0.5 to about 0.9.

9. The polyazacrown polymer of claim 1, wherein the polyazacrown polymer has a fractal structure.

10. The polyazacrown polymer of claim 1, further comprising:
    one or more cations retained by the azacrown moieties.

11. The polyazacrown polymer of claim 10, wherein the cations are selected from the group consisting of $Cd^{2+}$, $Hg^{2+}$, $Pb^{2+}$, $Tl^{3+}$, and combinations thereof.

12. The polyazacrown polymer of claim 10, wherein the cations comprise $Hg^{2+}$.

13. The polyazacrown polymer of claim 1, further comprising:
    one or more mercury derivatives retained by the azacrown moieties.

14. The polyazacrown polymer of claim 13, wherein the mercury derivatives are selected from the group consisting of Hg, $Hg_2^{2+}$, $Hg^{2+}$, $MeHg^+$, $Me_2Hg$, $PhHg^+$, and combinations thereof.

15. An azacrown derivative comprising:
    an azacrown moiety of the formula $C_{18}H_{36}N_8L_xR_{6-x}$, wherein:
    L is one or more linking units derived from one or more linking agents having two or more leaving groups;
    R is one or more of hydrogen (H), a functionalizing moiety, and combinations thereof; and,
    x ranges from 2 to 6.

16. The azacrown derivative of claim 15, wherein R consists of hydrogen (H).

17. The azacrown derivative of claim 15, wherein the linking agents comprise one or more of 1,4-bis(chloromethyl) benzene and 4,4'-bis(chloromethyl)-1,1'-biphenyl.

18. The azacrown derivative of claim 15, wherein x is 3 or more.

19. A polyazacrown compound comprising: two or more azacrown moieties of the azacrown derivative of claim 15, wherein adjacent azacrown moieties are linked by at least one linking unit.

20. A method of forming a polyazacrown polymer, the method comprising:
providing an azacrown monomer of the formula $C_{18}H_{36}N_8R_6$, wherein (1) R is one or more of hydrogen (H), a functionalizing moiety, and combinations thereof and (2) at least 2 of the R groups are hydrogen; and,
reacting the azacrown monomer with a sufficient amount of one or more linking agents having two or more leaving groups to form a polyazacrown polymer comprising linked azacrown moieties of the formula $C_{18}H_{36}N_8L_xR_{6-x}$, wherein x ranges from 2 to 6.

21. The method of claim 20, further comprising reacting the azacrown monomer with the linking agents in the presence of a base.

22. The method of claim 21, wherein consists of hydrogen (H).

23. The method of claim 21, wherein the base comprises a poorly nucleophilic base.

24. The method of claim 21, wherein the base is selected from the group consisting of N,N-diisopropyl-N-ethyl amine, N,N-diisopropyl-N-ethanol amine, N,N-dicyclohexyl-N-methyl amine, and combinations thereof.

25. The method of claim 20, further comprising:
reacting the azacrown monomer with the linking agents in the presence of a structure-directing agent; and,
removing the structure-directing agent after the polyazacrown polymer is formed, such that the resulting polyazacrown polymer has a microporous structure.

26. The method of claim 25, wherein the structure-directing agent comprises polyethylene oxide.

27. The method of claim 25, further comprising:
reacting the azacrown monomer with the linking agents in the presence of polyethylene oxide and a glass frit; and,
removing the polyethylene oxide and the glass frit after the polyazacrown polymer is formed, such that the resulting polyazacrown polymer has a fractal structure.

28. The method of claim 20, further comprising reacting the azacrown monomer with the linking agents in the presence of a solvent.

29. The method of claim 28, wherein the solvent is selected from the group consisting of water, ethylene glycol, dimethylformamide, dimethylacetamide, benzyl cyanide, decalin, mineral oil, and combinations thereof.

30. The method of claim 20, wherein reacting the azacrown with the linking agents further is performed at a temperature ranging from about 0° C. to about 220° C.

31. The method of claim 30, wherein reacting the azacrown monomer with the linking agents further is performed at a temperature ranging from about 100° C. to about 220° C.

32. The method of claim 20, wherein the linking agents comprise one or more of 1,4-bis(chloromethyl)benzene and 4,4'-bis(chloromethyl)-1,1'-biphenyl.

33. The method of claim 20, wherein x is more than 2 and the polyazacrown polymer is a network polymer.

* * * * *

UNITED STATES PATENT AND TRADEMARK OFFICE
CERTIFICATE OF CORRECTION

PATENT NO. : 7,968,673 B2
APPLICATION NO. : 12/070423
DATED : June 28, 2011
INVENTOR(S) : Mikhail Y. Redko et al.

It is certified that error appears in the above-identified patent and that said Letters Patent is hereby corrected as shown below:

Delete the title page and substitute therefore the attached title page showing the corrected number of claims in patent.

Column 29, line 5 to Column 30, line 29, cancel the text corresponding to issued claims 20 to 33 and insert the following text for claims 20 to 55:

--20. A polyazacrown polymer remediation cartridge comprising:
 a cartridge having an inlet, an outlet, and an interior volume; and,
 a polyazacrown polymer according to claim 1 occupying at least a portion of the interior volume of the cartridge such that a fluid flowing into the cartridge via the inlet is able to flow through the interior volume and contact the polyazacrown polymer before exiting the cartridge via the outlet.

21. The polyazacrown polymer remediation cartridge of claim 20, wherein x is more than 2 and the polyazacrown polymer is a network polymer.

22. The polyazacrown polymer remediation cartridge of claim 20, wherein the polyazacrown polymer is in the form of a packed bed of individual polymer particles.

23. The polyazacrown polymer remediation cartridge of claim 20, wherein the polyazacrown polymer has a microporous structure.

24. A method of forming a polyazacrown polymer, the method comprising:
 providing an azacrown monomer of the formula $C_{18}H_{36}N_8R_6$, wherein (1) R is one or more of hydrogen (H), a functionalizing moiety, and combinations thereof and (2) at least 2 of the R groups
 are hydrogen; and,
 reacting the azacrown monomer with a sufficient amount of one or more linking agents having two or more leaving groups to form a polyazacrown polymer comprising linked azacrown moieties of the formula $C_{18}H_{36}N_8L_xR_{6-x}$, wherein x ranges from 2 to 6.

Signed and Sealed this
Twenty-fourth Day of January, 2012

David J. Kappos
*Director of the United States Patent and Trademark Office*

25. The method of claim 26, wherein consists of hydrogen (H).

26. The method of claim 24, further comprising reacting the azacrown monomer with the linking agents in the presence of a base.

27. The method of claim 26, wherein the base comprises a poorly nucleophilic base.

28. The method of claim 26, wherein the base is selected from the group consisting of N,N-diisopropyl-N-ethyl amine, N,N-diisopropyl-N-ethanol amine, N,N-dicyclohexyl-N-methyl amine, and combinations thereof.

29. The method of claim 24, further comprising:
    reacting the azacrown monomer with the linking agents in the presence of a structure-directing agent; and,
    removing the structure-directing agent after the polyazacrown polymer is formed, such that the resulting polyazacrown polymer has a microporous structure.

30. The method of claim 29, wherein the structure-directing agent comprises polyethylene oxide.

31. The method of claim 29, further comprising:
    reacting the azacrown monomer with the linking agents in the presence of polyethylene oxide and a glass frit; and,
    removing the polyethylene oxide and the glass frit after the polyazacrown polymer is formed, such that the resulting polyazacrown polymer has a fractal structure.

32. The method of claim 24, further comprising reacting the azacrown monomer with the linking agents in the presence of a solvent.

33. The method of claim 32, wherein the solvent is selected from the group consisting of water, ethylene glycol, dimethylformamide, dimethylacetamide, benzyl cyanide, decalin, mineral oil, and combinations thereof.

34. The method of claim 24, wherein reacting the azacrown with the linking agents further is performed at a temperature ranging from about 0°C to about 220°C.

35. The method of claim 34, wherein reacting the azacrown monomer with the linking agents further is performed at a temperature ranging from about 100°C to about 220°C.

36. The method of claim 24, wherein the linking agents comprise one or more of 1,4-bis(chloromethyl)benzene and 4,4'-bis(chloromethyl)-1,1'-biphenyl.

37. The method of claim 24, wherein x is more than 2 and the polyazacrown polymer is a network polymer.

38. A method of remediating a mercury-contaminated fluid stream, the method comprising:

providing a contaminated fluid stream comprising one or more mercury derivatives; and, contacting a polyazacrown polymer of claim 1 with the contaminated fluid stream, thereby removing at least a portion of the mercury derivatives from the contaminated fluid stream to form a purified fluid stream and complexing the removed mercury derivatives with the polyazacrown polymer.

39. The method of claim 38, wherein the mercury derivatives are selected from the group consisting of Hg, $Hg_2^{2+}$, $Hg^{2+}$, $MeHg^+$, $Me_2Hg$, $PhHg^+$, and combinations thereof.

40. The method of claim 38, wherein the mercury derivatives comprise $Hg^{2+}$.

41. The method of claim 38, wherein x is more than 2 and the polyazacrown polymer is a network polymer.

42. The method of claim 38, wherein the purified fluid stream is substantially free from the mercury derivatives.

43. The method of claim 38, wherein providing a contaminated fluid stream further comprises:
providing a solid medium comprising one or more mercury derivatives; and,
contacting the solid medium with a fluid stream comprising a mercury-leaching salt, thereby removing at least a portion of the mercury derivatives from the solid medium to form the contaminated fluid stream comprising one or more mercury derivatives.

44. The method of claim 43, wherein the solid medium is selected from the group consisting of soil, sand, sediment, clay, and combinations thereof.

45. The method of claim 43, wherein the mercury-leaching salt comprises sodium iodide.

46. A method of regenerating a mercury-contaminated polyazacrown polymer, the method comprising:
providing a polyazacrown polymer according to claim 1, complexed to one or more mercury derivatives; and,
contacting the polyazacrown polymer with an acid and/or a water-soluble salt, thereby removing at least a portion of the complexed mercury derivatives from the polyazacrown polymer and forming a regenerated polyazacrown polymer.

47. The method of claim 46, wherein the mercury derivatives are selected from the group consisting of Hg, $Hg_2^{2+}$, $Hg^{2+}$, $MeHg^+$, $Me_2Hg$, $PhHg^+$, and combinations thereof.

48. The method of claim 46, wherein the mercury derivatives comprise $Hg^{2+}$.

49. The method of claim 46, wherein the polyazacrown polymer has an average functionality of more than 2 and the polyazacrown polymer is a network polymer.

50. The method of claim 46, wherein the regenerated polyazacrown polymer is substantially free from the mercury derivatives.

51. The method of claim 46, wherein the acid comprises hydrochloric acid.

52. The method of claim 46, further comprising contacting the regenerated polyazacrown polymer with a base to neutralize the acid.

53. The method of claim 52, wherein the base comprises sodium hydroxide.

54. The method of claim 46, wherein the water-soluble salt comprises one or more of sodium sulfide and ammonium sulfide.

55. The method of claim 46, further comprising concentrating the removed complexed mercury derivatives.--

(12) United States Patent
Redko et al.

(10) Patent No.: US 7,968,673 B2
(45) Date of Patent: Jun. 28, 2011

(54) POLYAZACROWN-BASED MATERIALS FOR MERCURY CAPTURE AND SYNTHESIS OF THOSE MATERIALS

(75) Inventors: Mikhail Y. Redko, East Lansing, MI (US); James E. Jackson, Haslett, MI (US); Volodymyr Tarabara, East Lansing, MI (US); Julian Taurozzi, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 672 days.

(21) Appl. No.: 12/070,423

(22) Filed: Feb. 19, 2008

(65) Prior Publication Data

US 2009/0057233 A1    Mar. 5, 2009

Related U.S. Application Data

(60) Provisional application No. 60/902,285, filed on Feb. 20, 2007.

(51) Int. Cl.
*C08G 73/06* (2006.01)
(52) U.S. Cl. ............................. 528/423; 528/422
(58) Field of Classification Search .............. 528/422, 528/423
See application file for complete search history.

(56) References Cited

U.S. PATENT DOCUMENTS 7,498,432 B2 * 3/2009 Redko et al. ............... 540/472
2004/0267009 A1 12/2004 Redko et al.

OTHER PUBLICATIONS

Trasande et al., Environmental Health Perspective. 2005, 113(5), p. 590-596.
Leonhaeuser et al., Engineering in Life Sciences, 2006, 6(2), p. 139-148.
Vidic, Environmental Separation of Heavy Metals, 2002, p. 15-44.
Ross, U.S. EPA Report EPA-670/2-73-080,1973.
Atwood et al., "Recent Developments in Mercury Science", in Structure and Bonding, 2006, 120 p. 163-182.
Liu et al., Advanced Materials, 1998, 10(2), p. 161-165.
Liu et al., Chemical Engineering & Technology, 1998, 21(1), p. 97-100.
Calmon, Ion Exch. Pollut. Control, 1979, 1, p. 201-206.
Michelsen et al., U.S. NTIS Report PB-244890, 1975.
Russell, U.S. NTIS Report DP-1395, 1975.
Tratnyek et al., U.S. NTIS Report Report PB-211128,1972.
Buckley et al., Canadian Report AECL-10174, 1990.
Okamoto et al., U.S. NTIS Report PB-249848, 1975.
Wing et al., U.S. Agr. Res. Serv., West. Reg., Report ARS-W-19, 1974, p. 26-31.
Redko et al., Synthesis, 2006, 5, p. 759-761.
Martin et al., Inorganica Chimica Acta, 1994, 218(1-2), p. 5-8.
De Santis et al., Inorg. Chem., 1997, 36(10), p 1998-2003.
Smith et al., Critical Stability Constants, Plenum Press, New York, 1975.
Jones, et al., J. Chem. Soc., Chem. Comm., 1979, 3, p. 140-141.
Farrell et al., Dalton Transactions, 2006, 26, p. 3204-3211.

* cited by examiner

*Primary Examiner* — Edward J Cain
(74) *Attorney, Agent, or Firm* — Ian C. McLeod

(57) ABSTRACT

Polyazacrown polymers based on the azacrown monomer 1,4,7,10,13,16,21,24-octaazabicyclo[8.8.8]hexacosane ("$H_6Aza222$") are disclosed. Azacrown monomer units are preferably linked with a suitable linking agent, and the resulting polymers are can absorb mercury from a water stream and form a stable complex therewith. Methods of making and using the polyazacrown polymers are also disclosed. The polymers have a high absorption capacity for and selectivity towards mercury, which properties are useful for the remediation of mercury-contaminated water. The polymers can be regenerated by the efficient removal of the absorbed mercury. Further, the absorbed mercury that is liberated from the polyazacrown polymers can be effectively concentrated and captured to prevent its re-release into the environment.

55 Claims, 6 Drawing Sheets